United States Patent
Kabe et al.

(10) Patent No.: US 12,158,682 B2
(45) Date of Patent: Dec. 3, 2024

(54) VIEWING ANGLE CONTROL ELEMENT AND DISPLAY DEVICE

(71) Applicant: Japan Display Inc., Tokyo (JP)

(72) Inventors: Masaaki Kabe, Tokyo (JP); Jin Hirosawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 314 days.

(21) Appl. No.: 17/731,405

(22) Filed: Apr. 28, 2022

(65) Prior Publication Data

US 2022/0252951 A1 Aug. 11, 2022

Related U.S. Application Data

(63) Continuation of application No. PCT/JP2020/034687, filed on Sep. 14, 2020.

(30) Foreign Application Priority Data

Nov. 13, 2019 (JP) ................................. 2019-205537

(51) Int. Cl.
*G02F 1/157* (2006.01)
*G02F 1/1335* (2006.01)
*G02F 1/1506* (2019.01)
*G02F 1/155* (2006.01)

(52) U.S. Cl.
CPC ........ *G02F 1/157* (2013.01); *G02F 1/133512* (2013.01); *G02F 1/1508* (2013.01); *G02F 1/155* (2013.01)

(58) Field of Classification Search
None
See application file for complete search history.

(56) References Cited

U.S. PATENT DOCUMENTS

| | | | | |
|---|---|---|---|---|
| 2007/0268429 | A1* | 11/2007 | So | G02F 1/133603 349/106 |
| 2009/0059135 | A1* | 3/2009 | Park | G02F 1/133555 349/114 |
| 2018/0341147 | A1* | 11/2018 | Sugitani | G02F 1/133617 |

FOREIGN PATENT DOCUMENTS

| | | | | |
|---|---|---|---|---|
| CN | 108828835 A | * | 11/2018 | ........... G02F 1/1323 |
| WO | 2014/084065 A1 | | 6/2014 | |

* cited by examiner

*Primary Examiner* — Shan Liu
(74) *Attorney, Agent, or Firm* — XSENSUS LLP

(57) ABSTRACT

According to one embodiment, a viewing angle control element includes a first substrate, a second substrate, and an electrolyte layer. The first substrate includes a first transparent substrate, a first light-shielding portion and a second light-shielding portion provided between the first transparent substrate and the electrolyte layer, a first transparent insulating layer provided between the first light-shielding portion and the second light-shielding portion, and a first transparent electrode. The first transparent electrode includes a first electrode portion overlapping the first light-shielding portion, a second electrode portion overlapping the second light-shielding portion, and an opening portion overlapping the first transparent insulating layer.

17 Claims, 20 Drawing Sheets

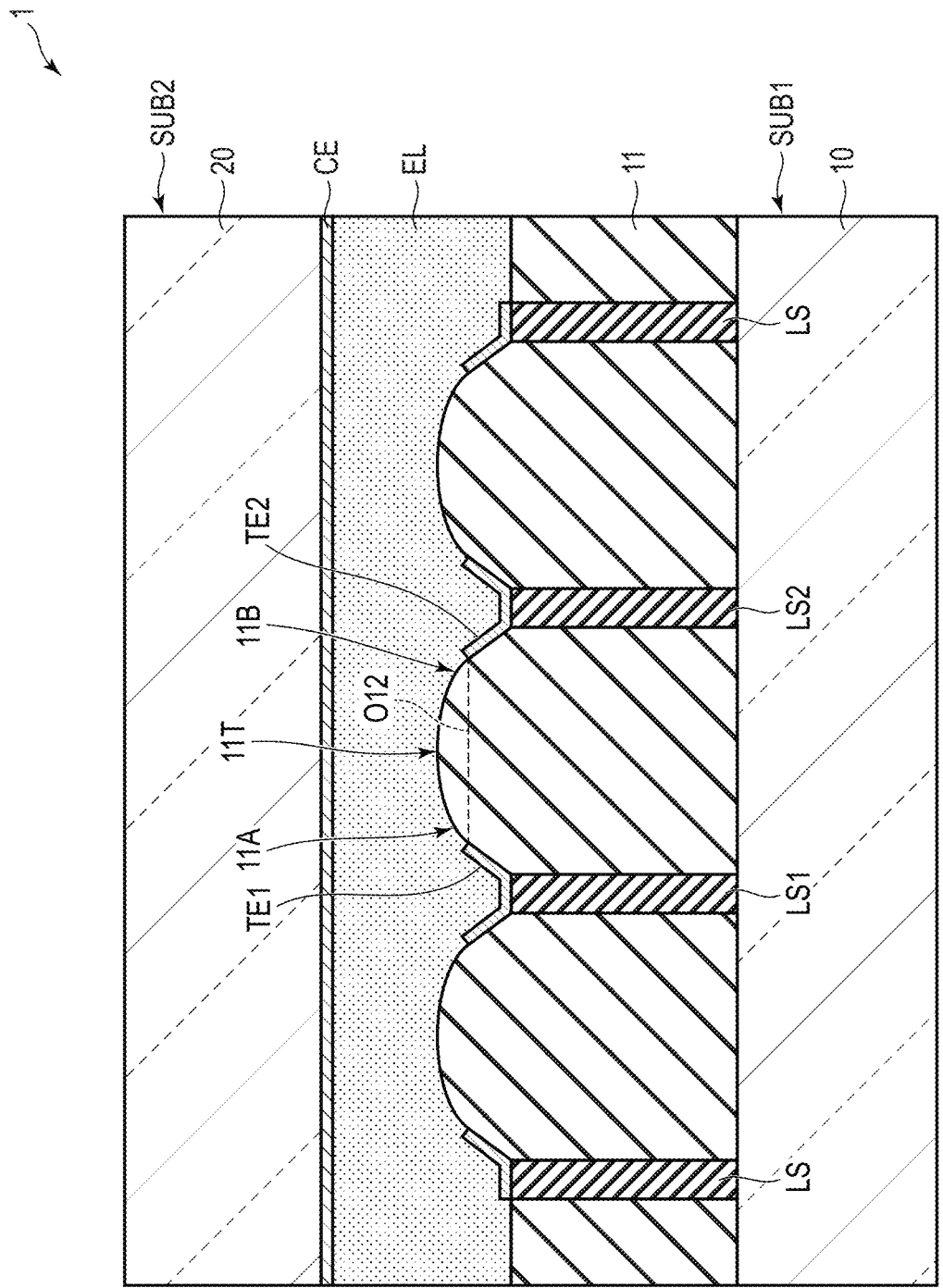
F I G. 6

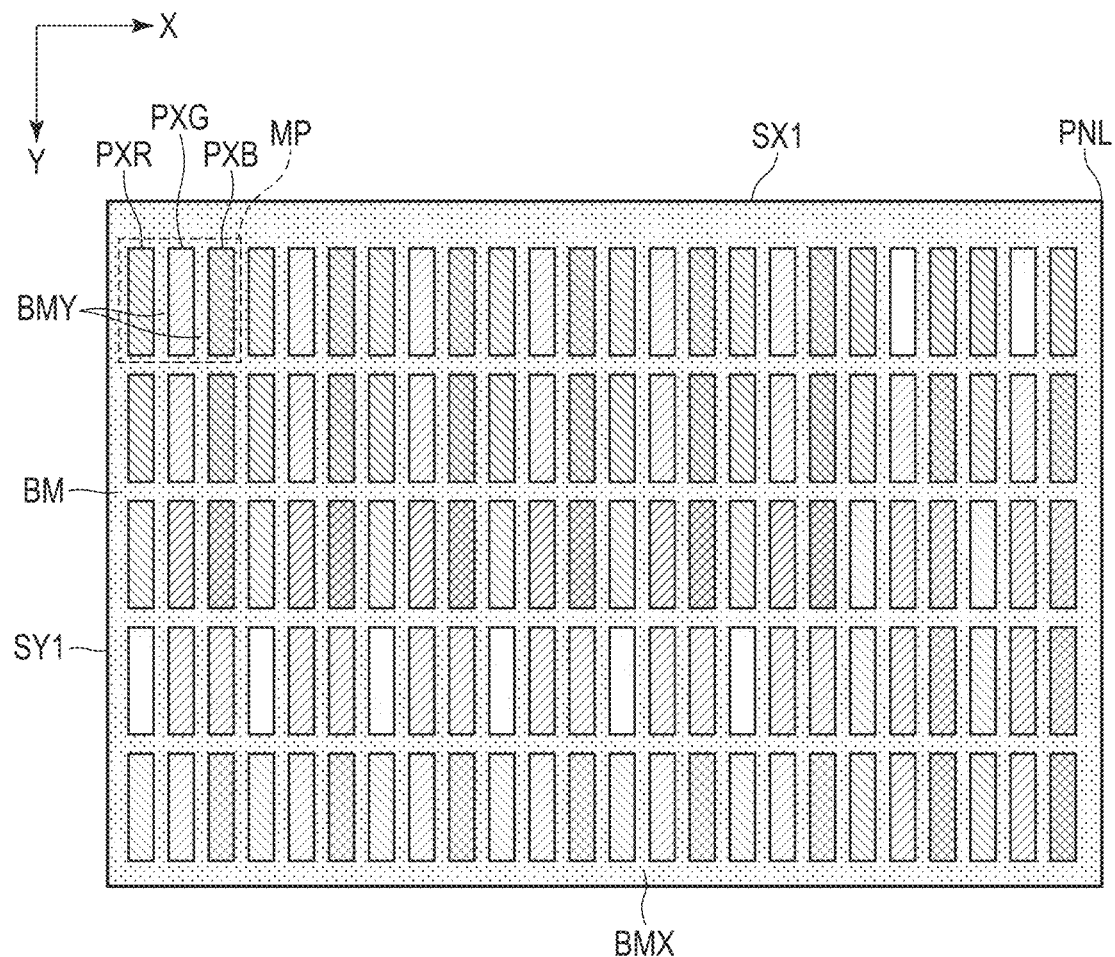
F I G. 16

VIEWING ANGLE CONTROL ELEMENT AND DISPLAY DEVICE

CROSS-REFERENCE TO RELATED APPLICATIONS

This application is a Continuation Application of PCT Application No. PCT/JP2020/034687, filed Sep. 14, 2020 and based upon and claiming the benefit of priority from Japanese Patent Application No. 2019-205537, filed Nov. 13, 2019, the entire contents of all of which are incorporated herein by reference.

FIELD

Embodiments described herein relate generally to a viewing angle control element and a display device.

BACKGROUND

In recent years, various technologies have been proposed to control the viewing angle at which a display panel can be observed. As an example, in a viewing angle control device provided with a plurality of conductive patterns, a transparent conductive layer, and an electrochromic layer interposed therebetween, the technology of forming louvers by depositing an electrochromic material on the conductive patterns is known. In such a viewing angle control device, the viewing angle is controlled by controlling the amount of electrochromic material deposited, i.e., the height of the louvers.

However, it is not easy to make high louvers appear in the normal direction of the conductive pattern, and it is necessary to apply a high voltage or it requires a long time to increase the amount of deposition.

BRIEF DESCRIPTION OF THE DRAWINGS

FIG. 6 shows a fourth configuration example of the viewing angle control element 1 of the embodiment.

FIG. 16 is a plan view showing a configuration example of a pixel layout in a display panel PNL.

DETAILED DESCRIPTION

Figure 1:
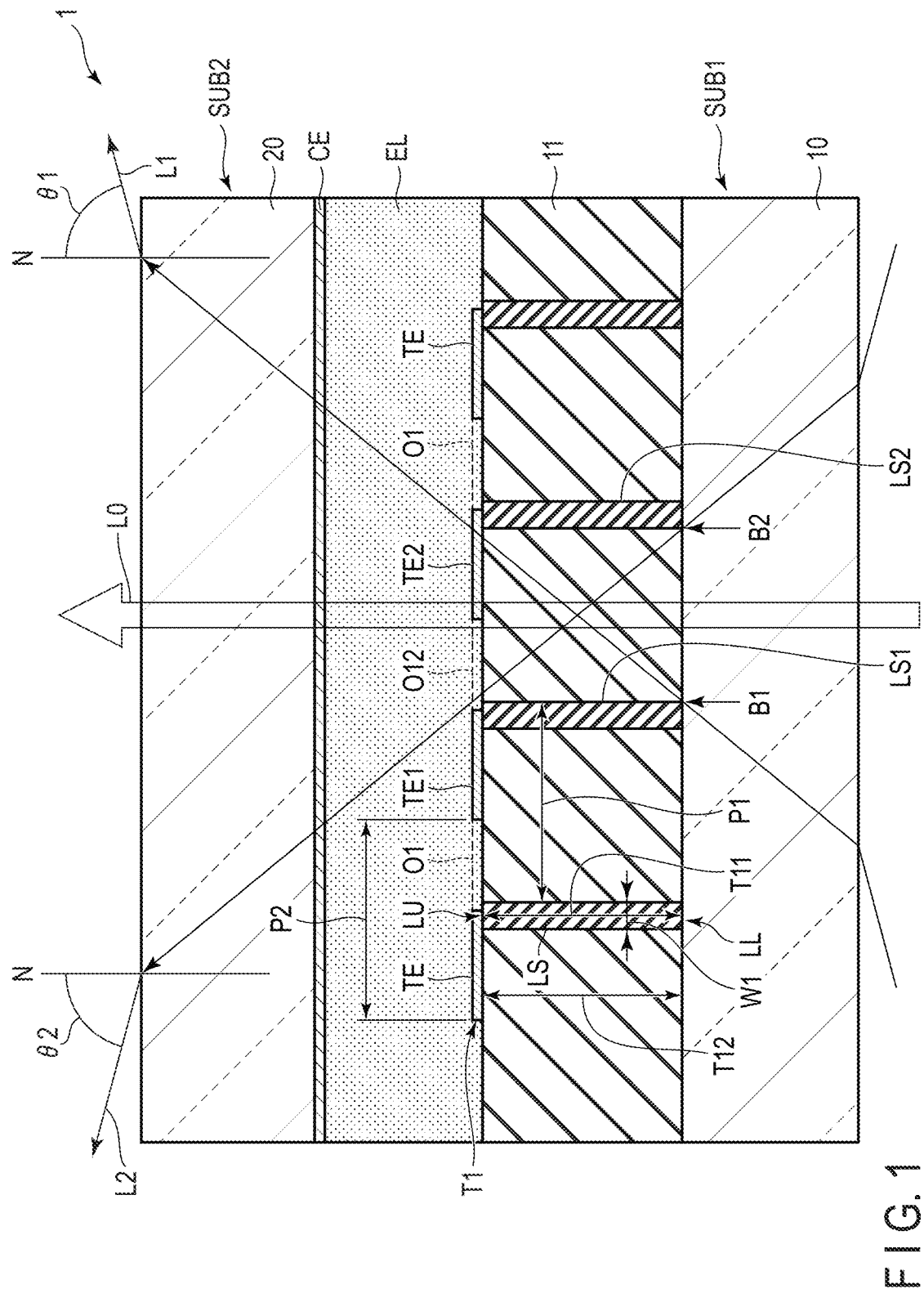
FIG. 1 shows a first configuration example of a viewing angle control element 1 of an embodiment.

In general, according to one embodiment, a viewing angle control element comprises a first substrate, a second substrate, and an electrolyte layer provided between the first substrate and the second substrate and including an electrochromic material, wherein the first substrate comprises: a first transparent substrate; a first light-shielding portion and a second light-shielding portion provided between the first transparent substrate and the electrolyte layer; a first transparent insulating layer provided between the first light-shielding portion and the second light-shielding portion; and a first transparent electrode in contact with the electrolyte layer, wherein the first transparent electrode includes a first electrode portion overlapping the first light-shielding portion, a second electrode portion overlapping the second light-shielding portion, and an opening portion overlapping the first transparent insulating layer.

According to another embodiment, a display device comprises: a display panel comprising a plurality of pixels; and a viewing angle control element overlapping the display panel, wherein the viewing angle control element comprises a first substrate, a second substrate, and an electrolyte layer provided between the first substrate and the second substrate and including an electrochromic material, the first substrate comprises: a first transparent substrate; a first light-shielding portion and a second light-shielding portion provided between the first transparent substrate and the electrolyte layer; a first transparent insulating layer provided between the first light-shielding portion and the second light-shielding portion; and a first transparent electrode in contact with the electrolyte layer, wherein the first transparent electrode includes a first electrode portion overlapping the first light-shielding portion, a second electrode portion overlapping the second light-shielding portion, and an opening portion overlapping the first transparent insulating layer.

According to one embodiment, a viewing angle control element and a display device capable of controlling a viewing angle can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 shows a first configuration example of a viewing angle control element 1 of the present embodiment. The viewing angle control element 1 comprises a first substrate SUB1, a second substrate SUB2, and an electrolyte layer EL. The first substrate SUB1 comprises a first transparent substrate 10, a light-shielding portion LS, a first transparent insulating layer 11, and a first transparent electrode T1. The second substrate SUB2 comprises a second transparent substrate 20 and a transparent counter electrode CE. The counter electrode CE is formed on almost the entire surface of the second transparent substrate 20. The first substrate SUB1 and the second substrate SUB2 are disposed so that the first transparent electrode T1 and the counter electrode CE face each other.

The first transparent substrate 10 and the second transparent substrate 20 are insulating substrates, such as glass substrates or resin substrates. The first transparent electrode T1 and the counter electrode CE are formed, for example, of a transparent conductive material such as indium tin oxide (ITO) or indium zinc oxide (IZO). The light-shielding portion LS is formed, for example, of a black organic material or an opaque metallic material. The first transparent insulating layer 11 is formed, for example, of a transparent organic material.

A plurality of light-shielding portions LS including a first light-shielding portion LS1 and a second light-shielding portion LS2 are arranged at intervals. In the example shown in FIG. 1, the light-shielding portion LS penetrates the first transparent insulating layer 11, and its lower portion LL is in contact with the first transparent substrate 10. However, the light-shielding portion LS is not limited to this example, and may be separated from the first transparent substrate 10, or may be provided by being divided into a plurality of layers, as described below. In addition, although the light-shielding portion LS does not have its upper portion LU covered by the first transparent insulating layer 11, its upper portion LU may also be covered by the first transparent insulating layer 11. The first transparent insulating layer 11 is, for example, a single layer, but may also be configured by multiple layers.

The light-shielding portion LS can be formed, for example, by forming the first transparent insulating layer 11 on the first transparent substrate 10, forming a groove in the first transparent insulating layer 11, and filling the groove with material for the light-shielding portion. Alternatively, the light-shielding portion LS may be formed by depositing the material for the light-shielding portion on the first transparent substrate 10 and then patterning it before forming the first transparent insulating layer 11. In the example shown in FIG. 1, a width W1 of the light-shielding portion LS is constant from the lower portion LL to the upper portion LU. However, it is not limited to this example. For example, the width W1 may become smaller as it moves from the first transparent substrate 10 toward the electrolyte layer EL, or may increase as it moves from the first transparent substrate 10 toward the electrolyte layer EL. In a case where the width W1 of the light-shielding portion LS is not constant, the maximum width of the light-shielding portion LS is defined as W1.

A thickness T11 of the light-shielding portion LS is larger than the width W1. The thickness T11 corresponds to a length from the lower portion LL to the upper portion LU. The thickness T11 of the light-shielding portion LS is 1.5 times greater than the width W1. In one example, the thickness T11 is approximately six times the width W1 (e.g., the width W1 is 0.75 µm, and the thickness T11 is 4.5 µm).

A pitch P1 of adjacent light-shielding portions LS is equal to or greater than a thickness T12 of the first transparent insulating layer 11. The pitch P1 corresponds to the sum of the width of one light-shielding portion LS and the width of the first transparent insulating layer 11 between adjacent light-shielding portions LS. The thickness T12 corresponds to a length from the surface of the first transparent substrate 10 to the lower surface of the first transparent electrode T1. In one example, the pitch P1 is equal to the thickness T12 (e.g., the pitch P1 and the thickness T12 are 4.5 µm).

The thickness T12 of the first transparent insulating layer 11 is equal to or greater than the thickness T11 of the light-shielding portion LS. In one example, the thickness T12 is equal to the thickness T11 (e.g., the thickness T11 and the thickness T12 are 4.5 µm).

The first transparent electrode T1 has a plurality of electrode portions TE including a first electrode portion TE1 and a second electrode portion TE2. The plurality of electrode portions TE are arranged at intervals. In other words, the first transparent electrode T1 has an opening portion O1 between adjacent electrode portions TE. The plurality of electrode portions TE are connected to a bus line described below, and are electrically at the same potential. A pitch (the sum of the width of one electrode portion TE and the width of one opening portion O1) P2 of the adjacent electrode portions TE is equal to the pitch P1 of the light-shielding portions LS.

Here, a more specific description will be provided by focusing on the two adjacent first and second light-shielding portions LS1 and LS2, and the two adjacent first and second electrode portions TE1 and TE2 in FIG. 1.

The first electrode portion TE1 overlaps the first light-shielding portion LS1, and the second electrode portion TE2 overlaps the second light-shielding portion LS2. An opening portion O12 between the first electrode portion TE1 and the second electrode portion TE2 overlaps the first transparent insulating layer 11 between the first light-shielding portion LS1 and the second light-shielding portion LS2. The first electrode portion TE1 is in contact with the first transparent insulating layer 11 and the first light-shielding portion LS1. The second electrode portion TE2 is in contact with the first transparent insulating layer 11 and the second light-shielding portion LS2. While this second electrode portion TE2 overlaps the first transparent insulating layer 11 between the first light-shielding portion LS1 and the second light-shielding portion LS2, the first electrode portion TE1 hardly overlaps the first transparent insulating layer 11 between the first light-shielding portion LS1 and the second light-shielding portion LS2. In other words, although the second electrode portion TE2 extends toward the first light-shielding portion LS1, the first electrode portion TE1 hardly extends toward the second light-shielding portion LS2. An extension width of the second electrode portion TE2 toward the first light-shielding portion LS1 is larger than an extension width of the first electrode portion TE1 toward the second light-shielding portion LS2. Therefore, the opening portion O12 is close to the first light-shielding portion LS1 between the first light-shielding portion LS1 and the second light-shielding portion LS2.

The electrolyte layer EL is provided between the first substrate SUB1 and the second substrate SUB2, and is in contact with the first transparent electrode T1 and the counter electrode CE. The electrolyte layer EL is formed of a liquid electrolyte containing an electrochromic material including silver, for example. The electrolyte layer EL is generally transparent when no voltage is applied. In the present embodiment, the electrolyte layer EL containing silver is described as an example; however, it is not limited thereto. Instead of silver, a liquid electrolyte containing an electrochromic material including other redox-reducible reflective materials, for example, metal materials such as platinum, gold, aluminum, manganese, or lead, may be used as the electrolyte layer EL.

Note that other functional layers, such as an electrochromic layer, may be provided between the electrolyte layer EL and the first transparent electrode T1, or between the electrolyte layer EL and the counter electrode CE.

In such a viewing angle control element 1, the electrolyte layer EL is generally transparent at a steady state when no voltage is applied to the electrolyte layer EL, and thus a transparent state is formed. In other words, an incident light that is transmitted through the first substrate SUB1 is transmitted through the second substrate SUB2.

At this time, the light transmitted between the first light-shielding portion LS1 and the second light-shielding portion LS2 is being focused. In the case of observing from a direction along a normal line N (front) of the viewing angle control element 1, a light L0 passing between the first light-shielding portion LS1 and the second light-shielding portion LS2 and transmitted through the second electrode portion TE2 and the opening portion O12 can be observed. In a case where an observation position is tilted to the right side of the drawing with respect to the normal line N, a light L1 transmitted through the vicinity of a boundary B1 between the first light-shielding portion LS1 and the first transparent insulating layer 11 and transmitted through the second electrode portion TE2 can be observed. Furthermore, in a case where the observation position is tilted to the left side of the drawing with respect to the normal line N, a light L2 transmitted through the vicinity of a boundary B2 between the second light-shielding portion LS2 and the first transparent insulating layer 11 and transmitted through the opening portion O12 can be observed. An angle $\theta 1$ formed by the light L1 and the normal line N, and an angle $\theta 2$ formed by the light L2 and the normal line N are substantially the same. In one example, the angles $\theta 1$ and $\theta 2$ are approximately 74°. Such a mode is referred to as a wide viewing angle mode.

Figure 2:
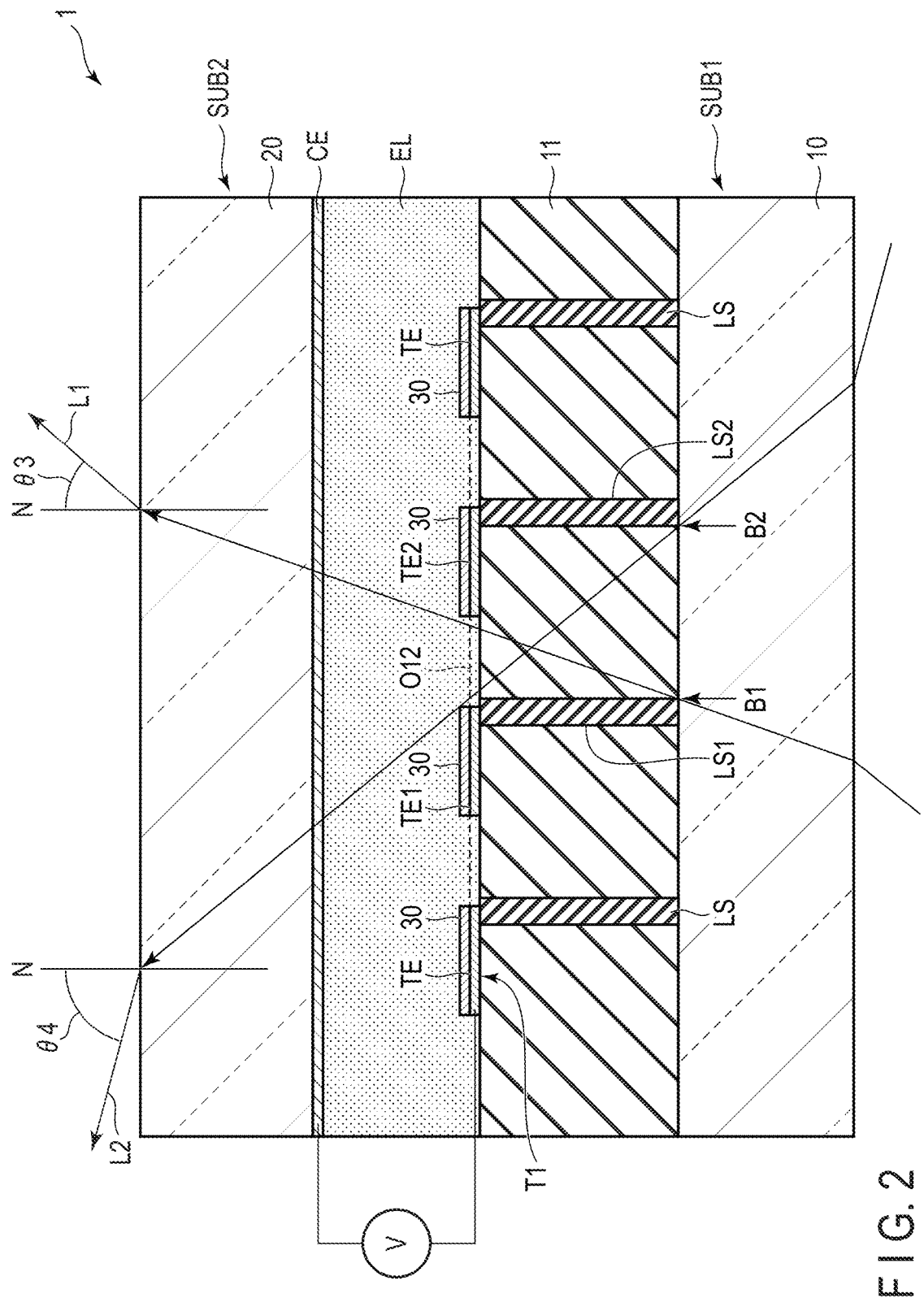
FIG. 2 illustrates a first narrow viewing angle mode of the viewing angle control element 1 shown in FIG. 1.

FIG. 2 illustrates a first narrow viewing angle mode of the viewing angle control element 1 shown in FIG. 1. In the viewing angle control element 1, for example, the potential of the first transparent electrode T1 is controlled to be negative relative to the potential of the counter electrode CE. In other words, the first transparent electrode T1 functions as a cathode and the counter electrode CE functions as an anode. In this manner, in a state where a predetermined voltage is applied to the electrolyte layer EL, silver ions eluted in the electrolyte layer EL are reduced, and fine silver particles are deposited on the surface of the first transparent electrode T1. As a result, the surface of each electrode portion TE, including the first electrode portion TE1 and the second electrode portion TE2, is covered with the deposited silver, and a light-shielding layer 30 is formed as an aggregate of aggregated silver. The light-shielding layer 30 may reflect or absorb the incident light transmitted through the first transparent substrate 10. Note that, in a case where the voltage application of the electrolyte layer EL is released, or the potential of the first transparent electrode T1 is temporarily controlled to become positive relative to the potential of the counter electrode CE, the deposited silver is oxidized to become silver ions, and is eluted in the electrolyte layer EL.

Here, the light transmitted between the first light-shielding portion LS1 and the second light-shielding portion LS2 is being focused. In a case where the observation position is tilted to the right side of the drawing with respect to the normal line N, the light L1 transmitted through the vicinity of the boundary B1 between the first light-shielding portion LS1 and the first transparent insulating layer 11 and transmitted through the opening portion O12 can be observed. Since the light-shielding layer 30 is formed on the second electrode portion TE2, the light L1 is not transmitted through the second electrode portion TE2. Therefore, an angle $\theta 3$ formed by the light L1 and the normal line N is smaller than the angle $\theta 1$ shown in FIG. 1. In one example, the angle $\theta 3$ is approximately 40°.

In addition, in a case where the observation position is tilted to the left side of the drawing with respect to the normal line N, in the same manner as the example shown in FIG. 1, the light L2 transmitted through the vicinity of the boundary B2 between the second light-shielding portion LS2 and the first transparent insulating layer 11 and transmitted through the opening portion O12 can be observed. In other words, an angle $\theta 4$ formed by the light L2 and the normal line N shown in FIG. 2 is the same as the angle $\theta 2$ shown in FIG. 1. In such a manner, a mode in which the viewing angle becomes narrower than the steady state in a case where the observation position is tilted to one side (e.g., right side) with respect to the normal line N, and the viewing angle is substantially the same as the steady state in a case where the observation position is tilted to the other side (e.g., left side) with respect to the normal line N, is referred to as a first narrow viewing angle mode.

In the case of observing from a direction along the normal line N of the viewing angle control element 1, a transmittance of approximately 83% is obtained in the wide viewing angle mode shown in FIG. 1, and a transmittance of approximately 46% is obtained in the first narrow viewing angle mode shown in FIG. 2.

According to such a first configuration example, an electrochromic element is applied as the viewing angle control element 1, and the light-shielding portions LS formed at substantially equal intervals function as louvers. Furthermore, the viewing angle can be controlled by switching between a state in which the electrode portions TE formed at substantially equal intervals are transparent (wide viewing angle mode) and a state in which the light-shielding layers 30 are formed on the electrode portions TE (first narrow viewing angle mode).

Next, other configuration examples of the viewing angle control device 1 will be described.

Figure 3:
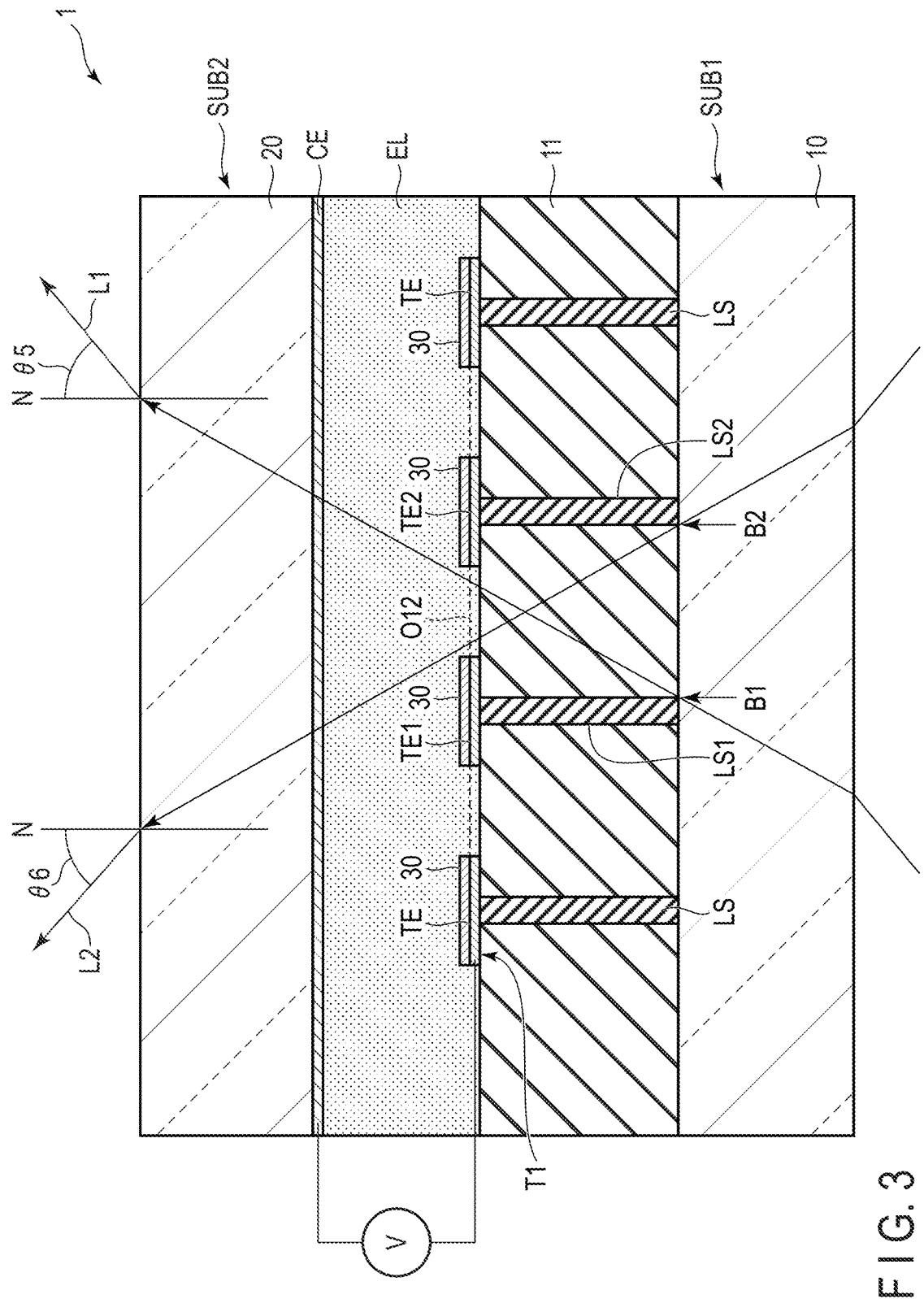
FIG. 3 shows a second configuration example of the viewing angle control element 1 of the embodiment.

FIG. 3 shows a second configuration example of the viewing angle control element 1 of the present embodiment. The second configuration example shown in FIG. 3 is different from the first configuration example shown in FIG. 1 and FIG. 2 in that an opening portion O12 is positioned substantially in the center between a first light-shielding portion LS1 and a second light-shielding portion LS2. Each of the first electrode portion TE1 and second electrode portion TE2 overlaps the first transparent insulating layer 11 between the first light-shielding portion LS1 and the second light-shielding portion LS2. An extension width of the first electrode portion TE1 toward the second light-shielding portion LS2 side is substantially the same as an extension width of the second electrode portion TE2 toward the first light-shielding portion LS1 side. For this reason, the opening portion O12 is positioned substantially in the center between the first light-shielding portion LS1 and the second light-shielding portion LS2, and overlaps the first transparent insulating layer 11.

Also in such a second configuration example, the wide viewing angle mode described with reference to FIG. 1 is realized in the steady state when no voltage is applied to the electrolyte layer EL.

On the other hand, in a state where a predetermined voltage is applied to the electrolyte layer EL, a light-shielding layer 30 is formed on the surface of each electrode portion TE including the first electrode portion TE1 and the second electrode portion TE2. In a case where the observation position is tilted to the right side of the drawing with respect to the normal line N, a light L1 transmitted through the vicinity of a boundary B1 between the first light-shielding portion LS1 and the first transparent insulating layer 11 and transmitted through the opening portion O12 can be observed. Since the light-shielding layer 30 is formed on the second electrode portion TE2, the light L1 is not transmitted through the second electrode portion TE2. Therefore, an angle θ5 formed by the light L1 and the normal line N is smaller than the angle θ1 shown in FIG. 1.

Also, in a case where the observation position is tilted to the left side of the drawing with respect to the normal line N, a light L2 transmitted through the vicinity of a boundary B2 between the second light-shielding portion LS2 and the first transparent insulating layer 11 and transmitted through the opening portion O12 can be observed. Since the light-shielding layer 30 is formed on the first electrode portion TE1, the light L2 is not transmitted through the first electrode portion TE1. Therefore, an angle θ6 formed by the light L2 and the normal line N is smaller than the angle θ2 shown in FIG. 1. In such a manner, a mode in which the viewing angle becomes narrower than the steady state in the case where the observation position is tilted to both sides (e.g., right and left sides) with respect to the normal line N is referred to as a second narrow viewing angle mode.

According to such a second configuration example, the viewing angle can be controlled by switching between the wide viewing angle mode and the second narrow viewing angle mode.

Figure 4:
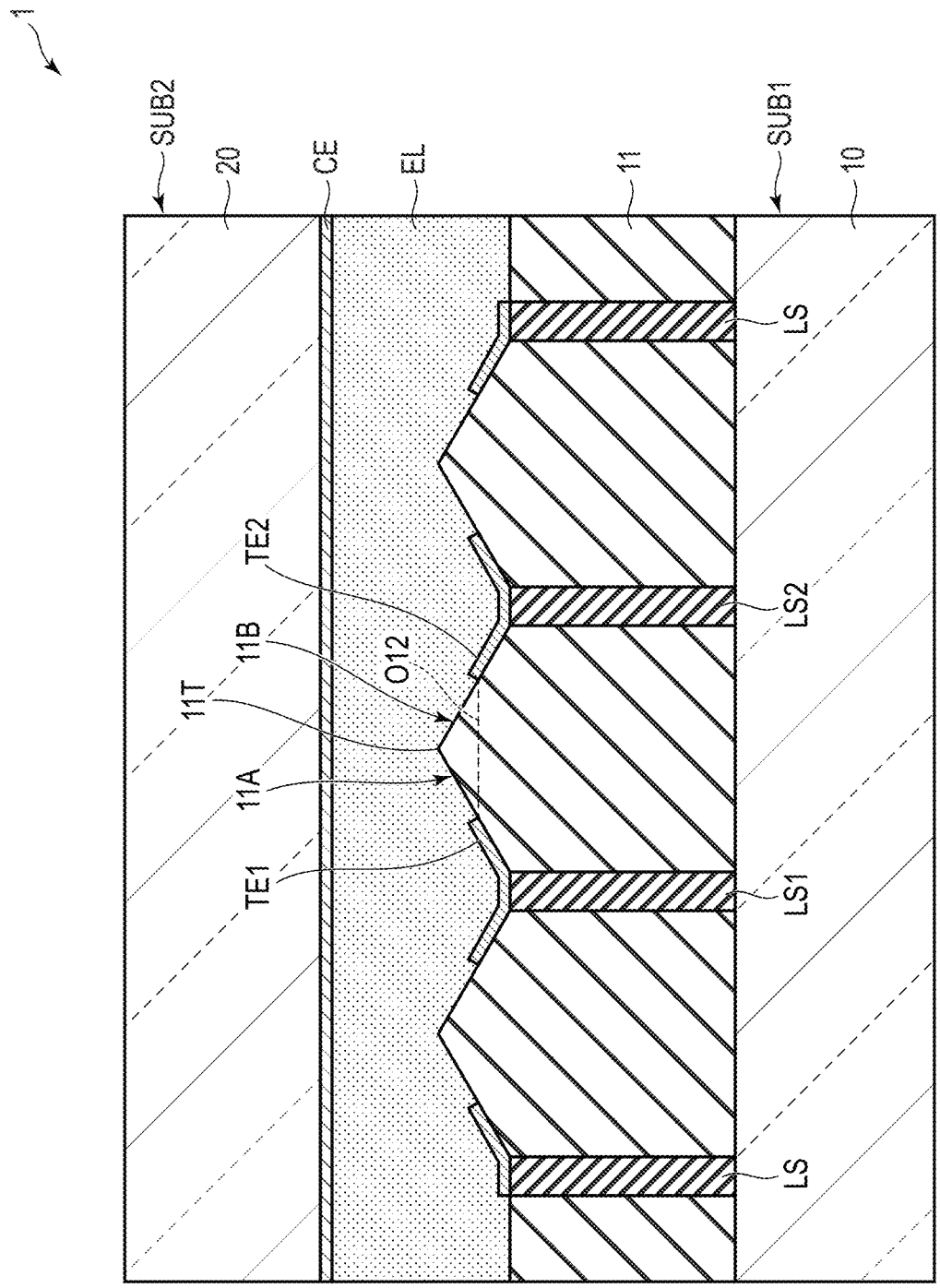
FIG. 4 shows a third configuration example of the viewing angle control element 1 of the embodiment.

FIG. 4 shows a third configuration example of the viewing angle control element 1 of the present embodiment. The third configuration example shown in FIG. 4 is different from the second configuration example shown in FIG. 3 in that a first transparent insulating layer 11 has a shape that protrudes toward a second substrate SUB2. Between a first light-shielding portion LS1 and a second light-shielding portion LS2, the first transparent insulating layer 11 has a top part 11T, a first slope 11A between the top part 11T and the first light-shielding portion LS1, and a second slop 11B between the top part 11T and the second light-shielding portion LS2. The top part 11T is closer to the second substrate SUB2 than the first light-shielding portion LS1 and the second light-shielding portion LS2. Also, the top part 11T is positioned substantially in the center between the first light-shielding portion LS1 and the second light-shielding portion LS2. The first slope 11A and the second slope 11B are substantially flat surfaces.

A first electrode portion TE1 is provided on the first slope 11A, and a second electrode portion TE2 is provided on the second slope 11B. Neither the first electrode portion TE1 nor the second electrode portion TE2 is provided on the top part 11T and its surrounding area. An opening portion O12 is positioned substantially in the center between the first light-shielding portion LS1 and the second light-shielding portion LS2. The top part 11T overlaps the opening portion O12.

According to such a third configuration example, in the same manner as the second configuration example shown in FIG. 3, the viewing angle can be controlled by switching between the wide viewing angle mode and the second narrow viewing angle mode.

Figure 5:
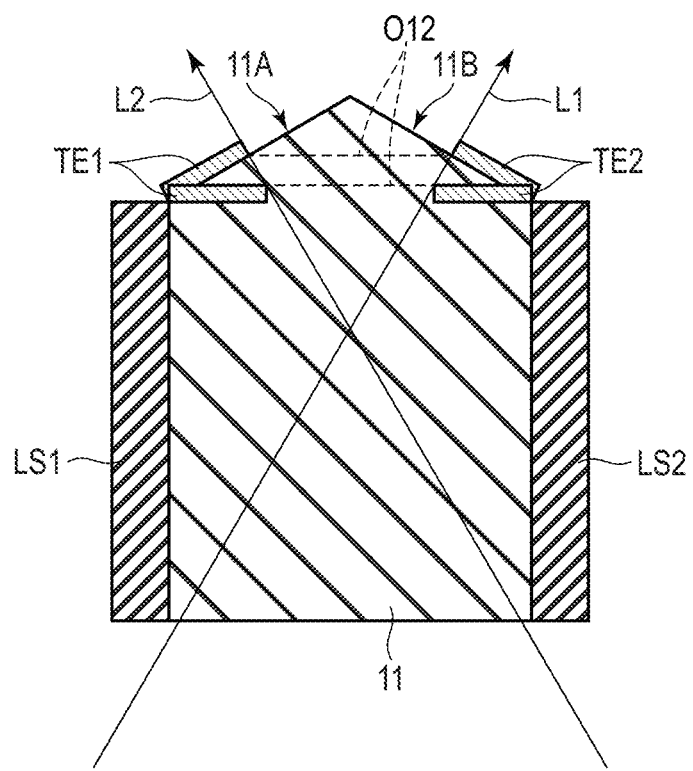
FIG. 5 shows a comparison of the size of an opening portion O12.

FIG. 5 shows a comparison of the size of the opening portion O12. The first electrode portion TE1 and the second electrode portion TE2 in the second configuration example shown in FIG. 3 are provided substantially horizontal. The first electrode portion TE1 and the second electrode portion TE2 in the third configuration example shown in FIG. 4 are provided on the first slope 11A and the second slope 11B, respectively. In the second narrow viewing angle mode, in the case of attempting to realize the same viewing angle in both the second configuration example and the third configuration example, the size of the opening portion O12 in the third configuration example becomes larger than the size of the opening portion O12 in the second configuration example. Therefore, in the second narrow viewing angle mode, when comparing the transmittance in the case of observing from the front, the transmittance of the third configuration example is higher than the transmittance of the second configuration example. In other words, in the second narrow viewing angle mode, from the viewpoint of obtaining a high transmittance in the case of observing from the front, it is desirable to apply the third configuration example.

Note that, also in the first narrow viewing angle mode, from the viewpoint of obtaining a high transmittance in the case of observing from the front, it is desirable to form a slope in the first transparent insulating layer 11 and provide an electrode portion on this slope.

FIG. 6 shows a fourth configuration example of the viewing angle control element 1 of the present embodiment. The fourth configuration example shown in FIG. 6 is different from the third configuration example shown in FIG. 4 in that a first slope 11A and a second slope 11B are curved surfaces. A first electrode portion TE1 is provided on a first slope 11A, and a second electrode portion TE2 is provided on a second slope 11B. Neither the first electrode portion TE1 nor the second electrode portion TE2 is provided at a top part 11T and its surrounding area. The top part 11T overlaps an opening portion O12.

In such a fourth configuration example, the same effect as in the third configuration example can be obtained.

In the third configuration example and the fourth configuration example, one of the first electrode portion TE1 and the second electrode portion TE2 may be omitted. For example, in the case where the first electrode portion TE1 is provided on the first slope 11A and the second electrode portion TE2 is provided on the second slope 11B, the first narrow viewing angle mode similar to the first configuration example shown in FIG. 2 can be realized.

Figure 7:
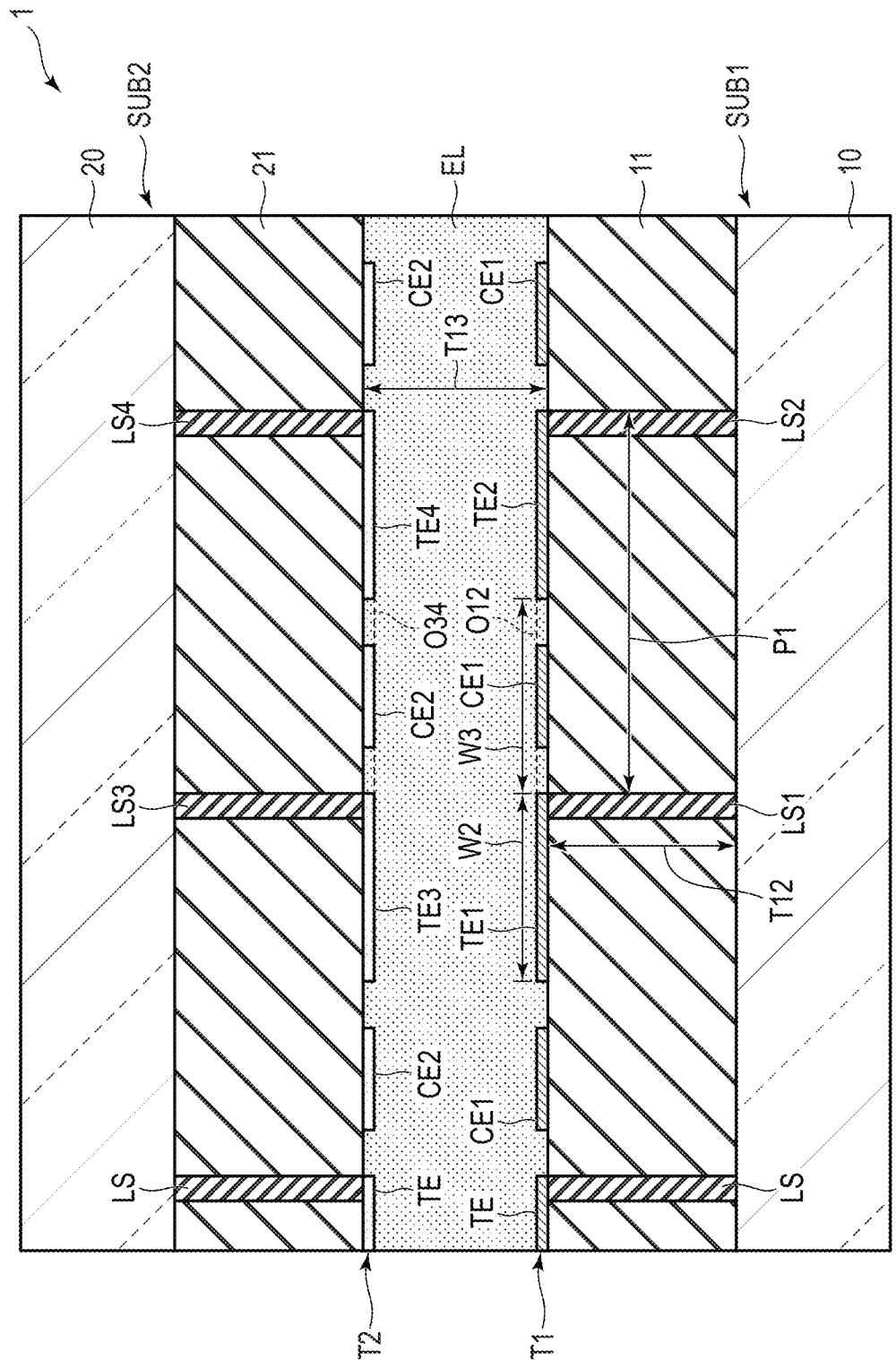
FIG. 7 shows a fifth configuration example of the viewing angle control element 1 of the embodiment.

FIG. 7 shows a fifth configuration example of the viewing angle control element 1 of the present embodiment. The fifth configuration example shown in FIG. 7 is different from the first configuration example shown in FIG. 1 in that a second substrate SUB2 is configured in the same manner as a first substrate SUB1.

The first substrate SUB1 comprises a first transparent substrate 10, a first transparent insulating layer 11, a light-shielding portion LS including a first light-shielding portion LS1 and a second light-shielding portion LS2, a first transparent electrode T1, and a transparent first counter electrode CE1. The first transparent electrode T1 comprises a plurality of electrode portions TE including a first electrode portion TE1 and a second electrode portion TE2. The first counter electrode CE1 is provided between adjacent electrode portions TE. In other words, the first counter electrode CE1 is provided in the opening portion O12 of the first transparent electrode T1. The first counter electrode CE1 is separated from each electrode portion TE of the first transparent electrode T1. The first transparent electrode T1 and the first counter electrode CE1 are formed of the same material.

The second substrate SUB2 comprises a second transparent substrate 20, a second transparent insulating layer 21, a light-shielding portion LS including a third light-shielding portion LS3 and a fourth light-shielding portion LS4, a second transparent electrode T2, and a transparent second counter electrode CE2.

The light-shielding portion LS is provided between the second transparent substrate 20 and an electrolyte layer EL. The third light-shielding portion LS3 is positioned directly above the first light-shielding portion LS1, and the fourth light-shielding portion LS4 is positioned directly above the second light-shielding portion LS2.

The second transparent electrode T2 comprises a plurality of electrode portions TE including a third electrode portion TE3 and a fourth electrode portion TE4. The third electrode portion TE3 is positioned directly above the first electrode portion TE1 and overlaps the third light-shielding portion LS3. The fourth electrode portion TE4 is positioned directly above the second electrode portion TE2 and overlaps the fourth light-shielding portion LS4. An opening portion O34 of the second transparent electrode T2 is positioned directly above the opening portion O12 and overlaps the second transparent insulating layer 21.

The second counter electrode CE2 is provided between adjacent electrode portions TE. The second counter electrode CE2 is separated from each electrode portion TE of the second transparent electrode T2. The second counter electrode CE2 is positioned directly above the first counter electrode CE1. The second counter electrode CE2 is provided in the opening portion O34 of the second transparent electrode T2. The second transparent electrode T2 and the second counter electrode CE2 are formed of the same material. Note that one of the first counter electrode CE1 or the second counter electrode CE2 may be omitted.

The first transparent electrode T1, the first counter electrode CE1, the second transparent electrode T2, and the second counter electrode CE2 are in contact with the electrolyte layer EL.

In the first substrate SUB1, a pitch P1 of adjacent light-shielding portions LS is larger than a thickness T12 of the first transparent insulating layer 11. In one example, the pitch P1 is approximately twice the thickness T12 (e.g., the pitch P1 is 15 μm, and the thickness T12 is 7.5 μm).

A width W2 of the electrode portion TE is about the same as a width W3 of the opening portion O12 (e.g., the width W2 and the width W3 are 7.5 μm).

A thickness T13 of the electrolyte layer EL is equal to the pitch P1 (e.g., the thickness T13 and the pitch P1 are 15 μm).

Note that, since the dimensional relationship of each portion in the second substrate SUB2 is the same as that in the first substrate SUB1, descriptions thereof are omitted.

Figure 8:
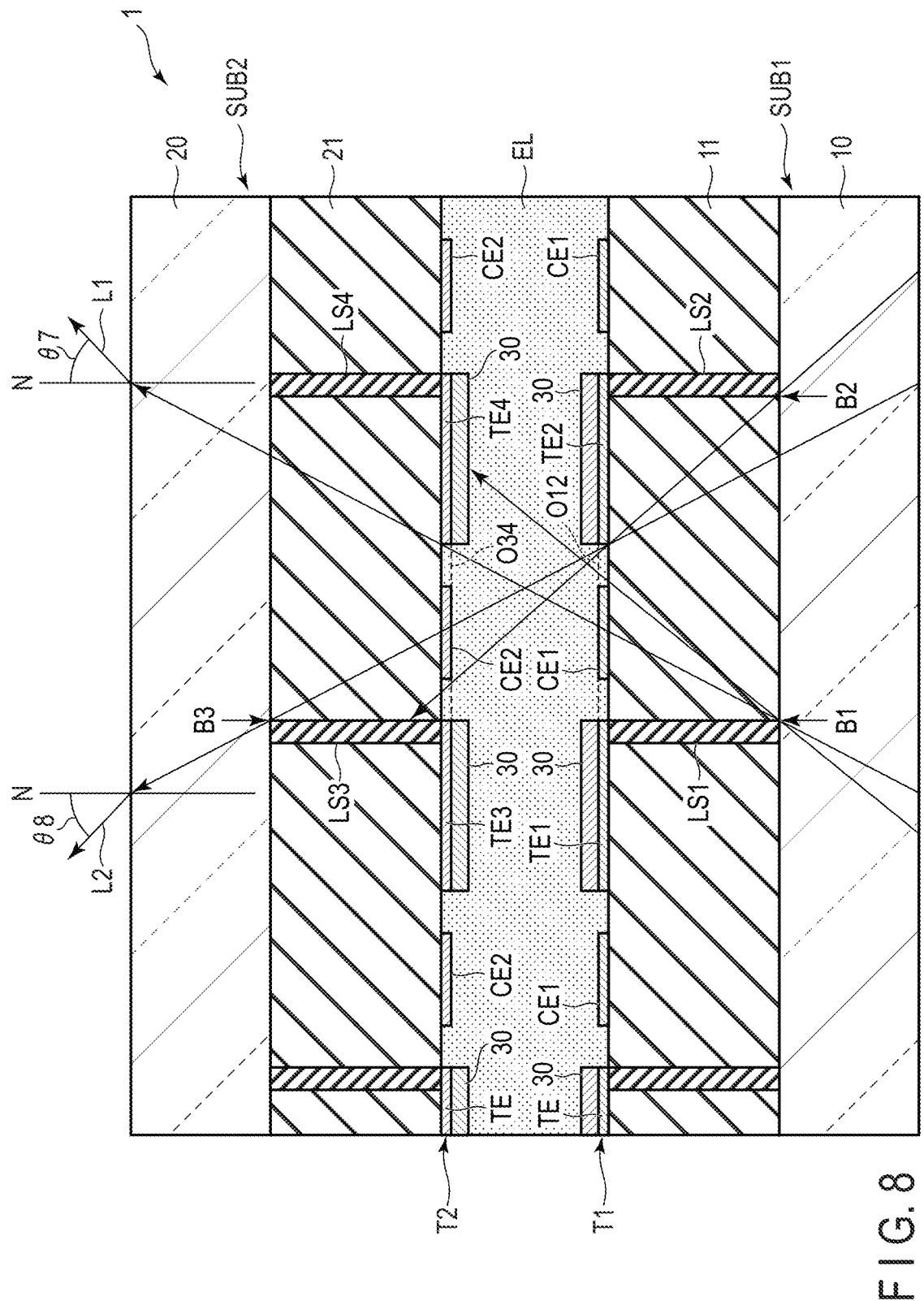
FIG. 8 illustrates a third narrow viewing angle mode of the viewing angle control element 1 shown in FIG. 7.

FIG. 8 illustrates a third narrow viewing angle mode of the viewing angle control element 1 shown in FIG. 7. Here, a case in which the first transparent electrode T1 and the second transparent electrode T2 function as cathodes, and the first counter electrode CE1 and the second counter electrode CE2 function as anodes is described. In a state where a predetermined voltage is applied to the electrolyte layer EL, a light-shielding layer 30 is formed on the surface of each electrode portion TE including the first electrode portion TE1, the second electrode portion TE2, the third electrode portion TE3, and the fourth electrode portion TE4.

In a case where an observation position is tilted to the right side of the drawing with respect to a normal line N1, of a light L1 transmitted through the vicinity of a boundary B1 between the first light-shielding portion LS1 and the first transparent insulating layer 11 and transmitted through the opening portion O12 or the first counter electrode CE1, the light L1 transmitted through the opening portion O34 can be observed. Since the light-shielding layer 30 is formed on the fourth electrode portion TE4, the light L1 is not transmitted through the fourth electrode portion TE4. Therefore, an angle θ7 formed by the light L1 and the normal line N is smaller than the angle θ1 shown in FIG. 1.

Also, in a case where the observation position is tilted to the left side of the drawing with respect to the normal line N, of a light L2 transmitted through the vicinity of a boundary B2 between the second light-shielding portion LS2 and the first transparent insulating layer 11, transmitted through the opening portion O12, and transmitted through the opening portion O34 or the second counter electrode CE2, the light L2 transmitted through the vicinity of a boundary B3 between the third light-shielding portion LS3 and the second transparent insulating layer 21 can be observed. The light L2 is not transmitted through the third light-shielding portion LS3. Therefore, an angle θ8 formed by the light L2 and the normal line N is smaller than the angle θ2 shown in FIG. 1. In such a manner, a mode in which the viewing angle becomes narrower than the steady state in the case where the observation position is tilted to both sides (e.g., right and left sides) with respect to the normal line N is referred to as the third narrow viewing angle mode.

According to such a fifth configuration example, the viewing angle can be controlled by switching between the wide viewing angle mode and the third narrow viewing angle mode.

In addition, since the second substrate SUB2 is configured in the same manner as the first substrate SUB 1, the third narrow viewing angle mode can be realized without expanding the width of the electrode portion. As a result, a high transmittance can be obtained in the case of observing from the front in the third narrow viewing angle mode. In addition, the first substrate SUB1 and the second substrate SUB 2 can be manufactured together, allowing the manufacturing cost to be reduced.

Figure 9:
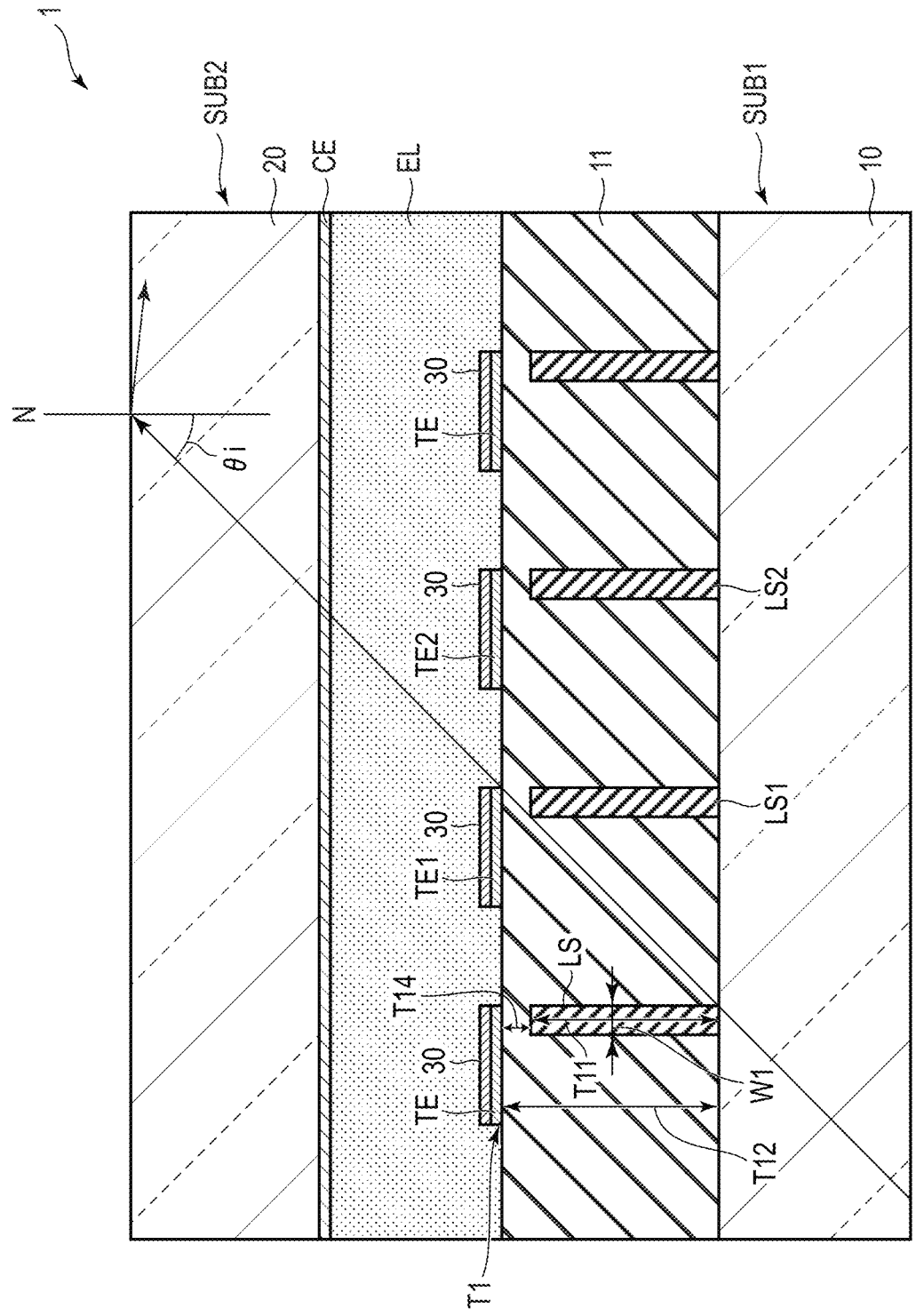
FIG. 9 shows another configuration example of the viewing angle control element 1 of the embodiment.

FIG. 9 shows another configuration example of the viewing angle control element 1 of the present embodiment. The configuration example shown in FIG. 9 is different from the first configuration shown in FIG. 1 in that a first transparent insulating layer 11 is interposed between a first light-shielding portion LS1 and a first electrode portion TE1, and between a second light-shielding portion LS2 and a second electrode part TE2.

A thickness T11 of a light-shielding portion LS is larger than a width W1. In one example, the thickness T11 is approximately 1.5 times the width W1 (e.g., the width W1 is 3 μm, and the thickness T11 is 4.5 μm).

A thickness T12 of the first transparent insulating layer 11 is larger than the thickness T11 of the light-shielding portion LS. In one example, the thickness T12 is equal to the thickness T11 (e.g., the thickness T11 and the thickness T12 are 4.5 μm).

A thickness T14 of the first transparent insulating layer 11 interposed between the light-shielding portion LS and an electrode portion TE is equal to or smaller than the width W1. In one example, the thickness T14 is equal to the width W1 (e.g., the thickness T14 and the width W1 are 3 μm).

Here, a light L3 transmitted between the first light-shielding portion LS1 and the first electrode portion TE1 is being focused. In a case where the first electrode portion TE1 overlaps the first light-shielding portion LS1 and is covered by a light-shielding layer 30, an incidence angle θi of the light L3 reaching the interface between a second transparent substrate 20 and air will be approximately 45°. In a case where the refractive index of the air is 1 and the refractive index of the second transparent substrate 20 is 1.5, the light L3 is totally reflected. In other words, the light L3 has almost no effect on the control of the viewing angle without the need to block it with the light-shielding portion LS or the light-shielding layer 30. When the light-shielding portion LS is designed from this perspective, the light-shielding portion LS does not necessarily have to be formed in a single layer, nor does it need to be in contact with the electrode area TE. A more specific configuration example will be described below.

Figure 10:
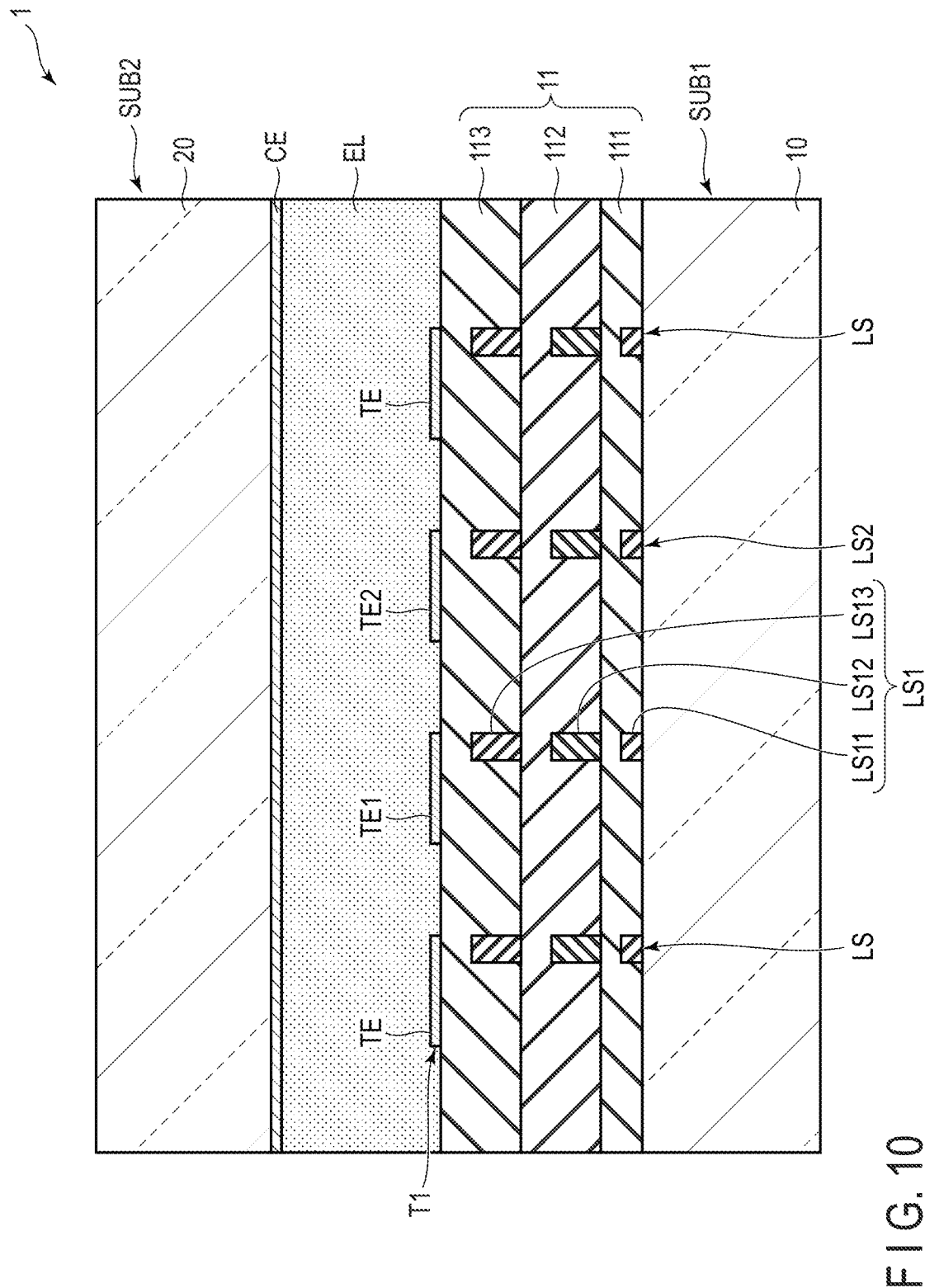
FIG. 10 shows a sixth configuration example of the viewing angle control element 1 of the embodiment.

FIG. 10 shows a sixth configuration example of the viewing angle control element 1 of the present embodiment. A first transparent insulating layer 11 includes a first insulating layer 111 between a first transparent substrate 10 and an electrolyte layer EL, a second insulating layer 112 between the first insulating layer 111 and the electrolyte layer EL, and a third insulating layer 113 between the second insulating layer 112 and the electrolyte layer EL. The first insulating layer 111, the second insulating layer 112, and the third insulating layer 113 are formed, for example, of organic materials.

Each light-shielding portion LS including a first light-shielding portion LS1 and a second light-shielding portion LS2 is configured in the same manner; however, here, the first light-shielding portion LS1 will be described. The first light-shielding portion LS1 includes a first portion LS11 between the first transparent substrate 10 and the first insulating layer 111, a second portion LS12 between the first insulating layer 111 and the second insulating 112, and a third portion LS13 between the second insulating layer 112 and the third insulating layer 113. The second portion LS12 is positioned directly above the first portion LS11, and the third portion LS13 is positioned directly above the second portion LS12. The first insulating layer 111 is interposed between the first portion LS11 and the second portion LS12, the second insulating layer 112 is interposed between the second portion LS12 and the third portion LS13, and the third insulating layer 113 is interposed between the third portion LS13 and a first electrode portion TE1. An interval between the first portion LS11 and the second portion LS12, an interval between the second portion LS12 and the third portion LS13, and an interval between the third portion LS13 and the first electrode portion TE1 can be set appropriately based on the concept described with reference to FIG. 9.

In such a sixth configuration example, the same effects as in the first configuration example above can be obtained.

Note that, for the first transparent insulating layer 11 and the first light-shielding portion LS1, a multilayer structure of two or more layers can be applied. Therefore, they are not limited to the three-layer structure shown in the drawing.

Figure 11:
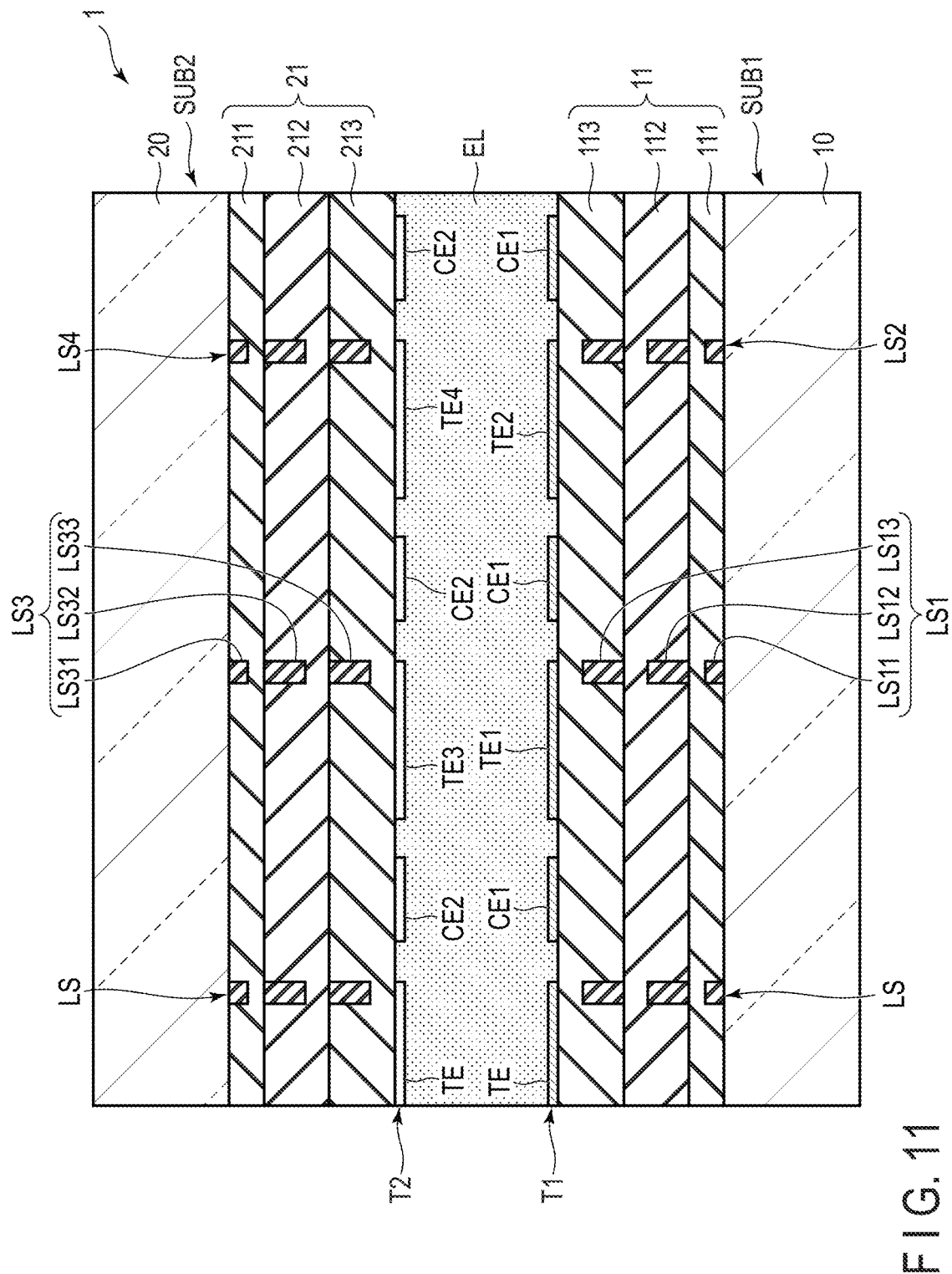
FIG. 11 shows a seventh configuration example of the viewing angle control element 1 of the embodiment.

FIG. 11 shows a seventh configuration example of the viewing angle control element 1 of the present embodiment. The seventh configuration example shown in FIG. 11 is different from the sixth configuration example shown in FIG. 10 in that a second substrate SUB2 is configured in the same manner as the first substrate SUB1. Since the configuration of the first substrate SUB1 is identical to that of the sixth configuration example, descriptions will be omitted.

In the second substrate SUB2, a second transparent insulating layer 21 includes an insulating layer 211 between a second transparent substrate 20 and an electrolyte layer EL, an insulating layer 212 between the insulating layer 211 and the electrolyte layer EL, and an insulating layer 213 between the insulating layer 212 and the electrolyte layer EL. The insulating layer 211, the insulating layer 212, and the insulating layer 213 are formed, for example, of organic materials.

Each light-shielding portion LS including a third light-shielding portion LS3 and a fourth light-shielding portion LS4, is configured in the same manner; however, here, the third light-shielding portion LS3 will be described. The third light-shielding portion LS3 includes a portion LS31 between a first transparent substrate 10 and the insulating layer 211, a portion LS32 between the insulating layer 211 and the insulating layer 212, and a portion LS33 between the insulating layer 212 and the insulating layer 213.

In such a seventh configuration example, the same effect as in the fifth configuration example described with reference to FIG. 7 and FIG. 8 can be obtained.

Next, a display device DSP to which the above viewing angle control element 1 is applied will be described.

Figure 12:
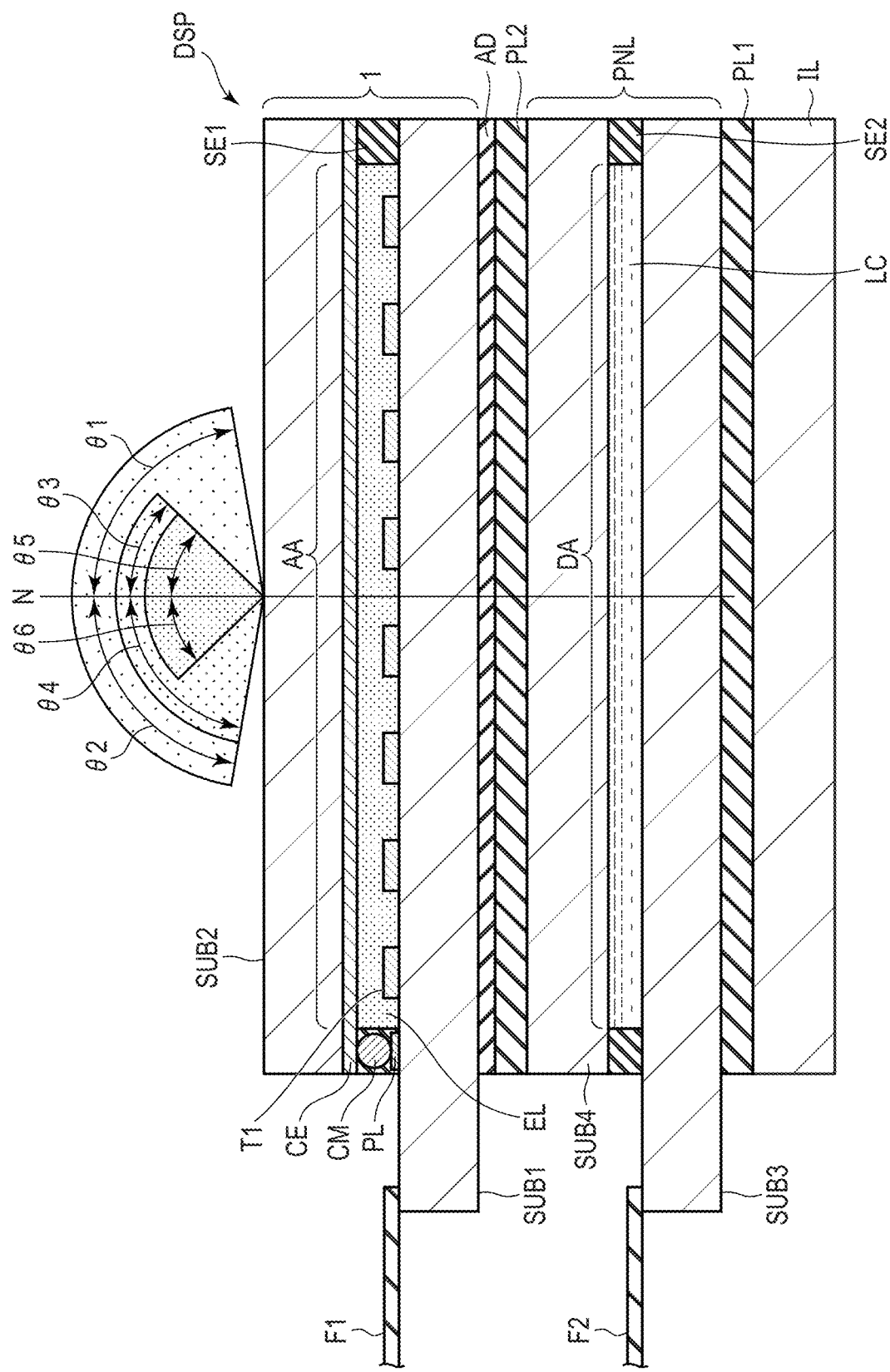
FIG. 12 shows a configuration example of a display device DSP according to the embodiment.

FIG. 12 shows an example configuration of the display device DSP according to the present embodiment. The display device DSP comprises a viewing angle control element 1 and a display panel PNL. The display panel PNL may be a transmissive display panel that selectively transmits an illumination light, a reflective display panel that selectively reflects an illumination light, or a display panel with a self-luminous element such as an organic electroluminescent element. The transmissive or reflective display panel PNL can be, for example, a display panel with a liquid crystal layer or a display panel with an electrophoresis layer. In the example shown in FIG. 12, the display panel PNL is a transmissive liquid crystal display panel. For this reason, the display device DSP further comprises an illumination device IL that illuminates the display panel PNL, a first polarizing plate PL1, and a second polarizing plate PL2. The illumination device IL, the first polarizing plate PL1, the display panel PNL, the second polarizing plate PL2, and the viewing angle control element 1 are disposed in this order along the thickness direction of the display device DSP.

The viewing angle control element 1 comprises a first substrate SUB1, a second substrate SUB2, and an electrolyte layer EL. The electrolyte layer EL is held between the first substrate SUB1 and the second substrate SUB2, and is sealed by a sealant SE1. An area surrounded by the sealant SE1 is referred to as an effective area or an active area AA. In the active area AA, a first transparent electrode T1 and a counter electrode CE are in contact with the electrolyte layer EL. The first substrate SUB1 comprises a power feed line PL. The counter electrode CE is electrically connected to the power feed line PL via a conductive material CM. A wiring substrate F1 is connected to the first substrate SUB1.

The display panel PNL comprises a third substrate SUB3, a fourth substrate SUB4, and a liquid crystal layer LC. The liquid crystal layer LC is held between the third substrate SUB3 and the fourth substrate SUB4, and is sealed by a sealant SE2. An area surrounded by the sealant SE2 includes a display area DA for displaying images. As the display panel PNL, a well-known liquid crystal panel can be applied. A wiring substrate F2 is connected to the third substrate SUB3.

The viewing angle control element 1 overlaps the display panel PNL. The active area AA of the viewing angle control element 1 overlaps the display area DA of the display panel PNL.

The first polarizing plate PL1 is positioned between the illumination device IL and the display panel PNL, and is bonded to the third substrate SUB3, for example. The second polarizing plate PL2 is positioned between the display panel PNL and the viewing angle control element 1, and is bonded to the fourth substrate SUB4, for example. The first polarizing plate PL1 and the second polarizing plate PL2 are disposed so that their respective polarization axes are substantially orthogonal (cross-nicol), for example. The first polarizing plate PL1 and the second polarizing plate PL2 may include various retardation plates.

The viewing angle control element 1 is bonded to the second polarizing plate PL2 by a transparent adhesive layer AD.

The illumination device IL is positioned on the back side of the display panel PNL with the first polarizing plate PL1 interposed therebetween. The illumination device IL is a so-called surface light source device and is configured to emit illumination light toward the back side of the display panel PNL and illuminate the display panel PNL. Of the illumination light emitted from the illumination device IL, a polarizing component transmitted through the first polarizing plate PL1 is transmitted through the display panel PNL. Of the light transmitted through the display panel PNL, the polarizing component transmitted through the second polarizing plate PL2 is transmitted through the viewing angle control element 1.

In the display device DSP provided with such a viewing angle control element 1, each of the above modes will be explained. Note that the viewing angle described here is defined as the maximum angle from the normal line N of the display device DSP where the contrast ratio of the image displayed in the display area DA is 10 or more.

In a wide viewing angle mode, a viewing angle θ1 on the right side with respect to the normal line N and a viewing angle θ2 on the left side with respect to the normal line N are obtained. At this time, the viewing angle θ1 and the viewing angle θ2 are substantially the same. In other words, the area in which the image can be observed is almost symmetrical between the left side and the right side with respect to the normal line N.

In a first narrow viewing angle mode, a viewing angle θ3 on the right side with respect to the normal line N and a viewing angle θ4 on the left side with respect to the normal line N are obtained. In this case, the viewing angle θ4 is larger than the viewing angle θ3. In other words, the area in which the image can be observed is asymmetrical between the left side and the right side with respect to the normal line N. The first narrow viewing angle mode is mainly suitable for observing images from an oblique direction inclined to the left side with respect to the normal line N, and also prevents images from being observed from the right side with respect to the normal line N.

In a second narrow viewing angle mode, a viewing angle θ5 on the right side with respect to the normal line N and a viewing angle θ6 on the left side with respect to the normal line N are obtained. In this case, the viewing angle θ5 and the viewing angle θ6 are substantially the same. However, the viewing angle θ5 and the viewing angle θ6 are both smaller than the viewing angle θ1. In other words, an area in which the image can be observed is limited to the direction along the normal line N (front). The second narrow viewing angle mode is mainly suitable for observing images near the front, and also prevents images from being observed from oblique directions inclined to the right side and the left side with respect to the normal line N.

Figure 13:
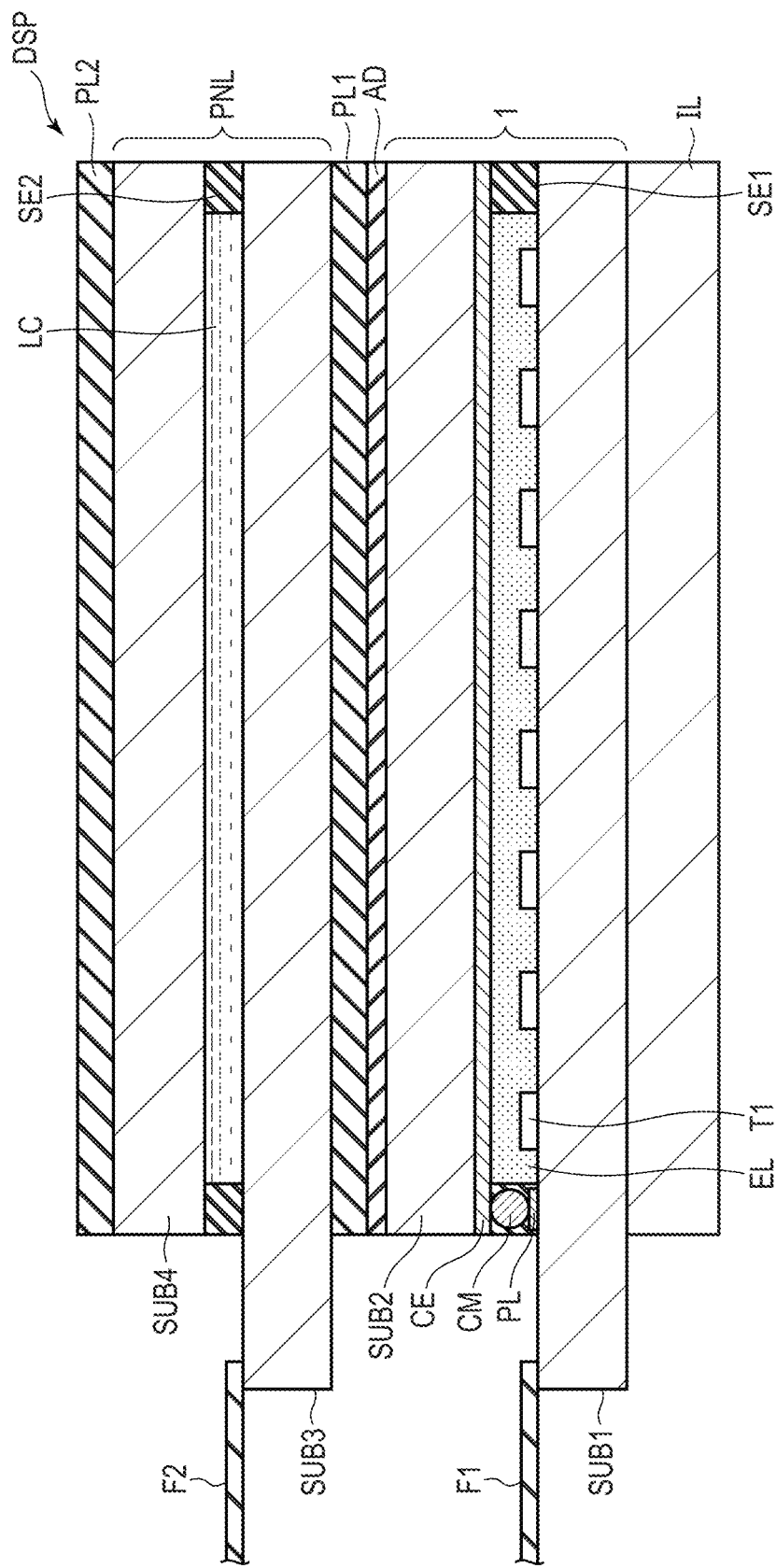
FIG. 13 shows another configuration example of the display device DSP according to the embodiment.

FIG. 13 shows another configuration example of the display device DSP according to the present embodiment. The configuration example shown in FIG. 13 is different from the configuration example shown in FIG. 12 in that a viewing angle control element 1 is positioned between an illumination device IL and a display panel PNL. The viewing angle control element 1 is bonded to a first polarizing plate PL1 by an adhesive layer AD.

In such a configuration example, even if a light-shielding layer formed on the surface of a first transparent electrode T1 has light reflectivity, it is hardly visible directly to the observer, thus suppressing the deterioration of display quality. Also, in a case where the light-shielding layer has light reflectivity, the illumination light from the illumination device IL is reflected by the light-shielding layer and can be reused. Therefore, the efficiency of light utilization can be improved compared to the case where the illumination light is absorbed by the light-shielding layer.

Figure 14:
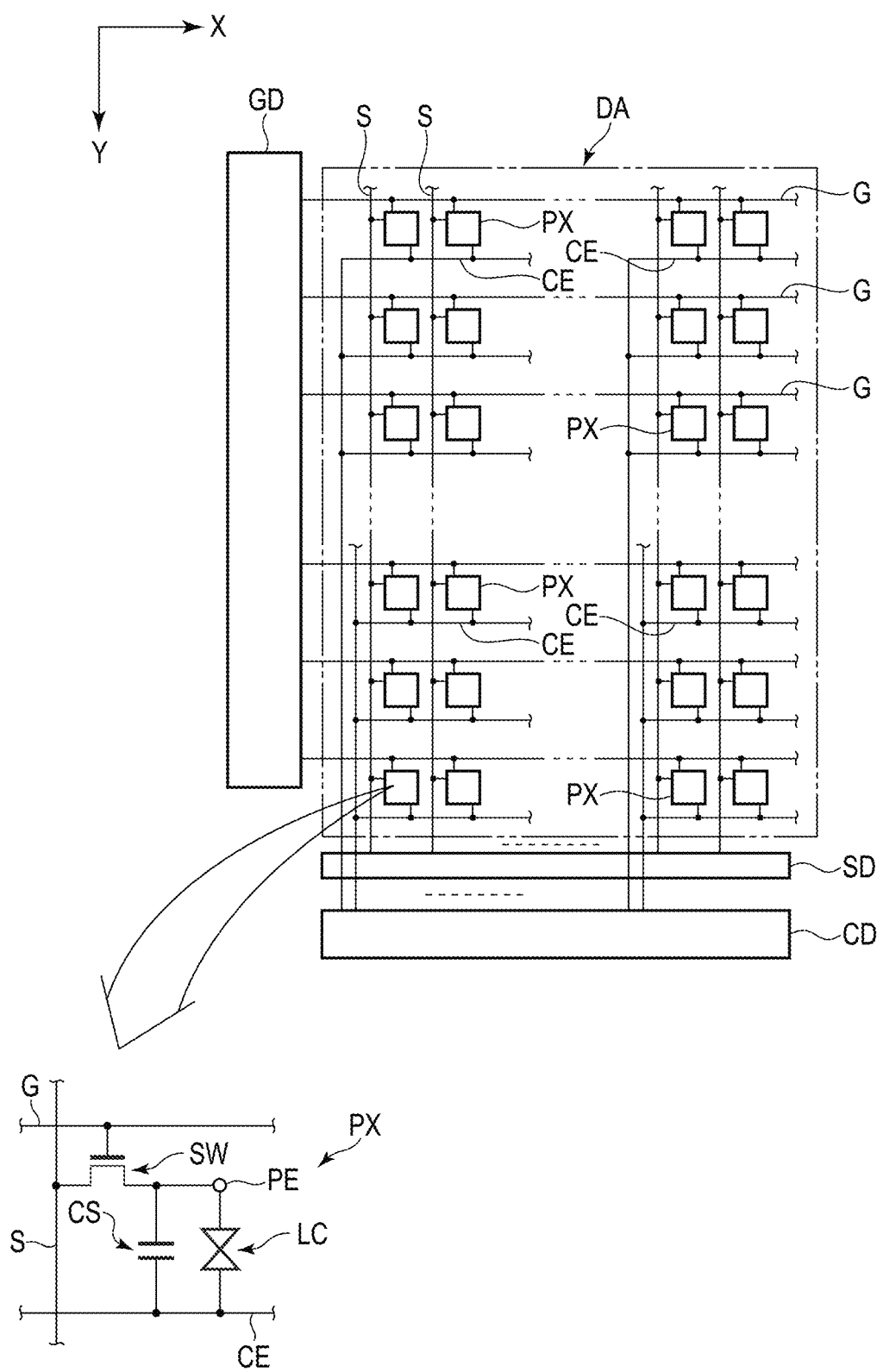
FIG. 14 shows a configuration example a display panel PNL.

FIG. 14 shows a configuration example of the display panel PNL. The display area DA comprises a plurality of pixels PX disposed in a matrix in a first direction X and a second direction Y. A pixel PX here indicates the smallest unit that can be individually controlled according to a pixel signal, and may be referred to as a sub-pixel. The pixel PX is, for example, a red pixel that displays red, a green pixel that displays green, or a blue pixel that displays blue.

A plurality of scanning lines G are connected to a scanning line driver GD. A plurality of signal lines S are connected to a signal line driver SD. A counter electrode CE is disposed over the plurality of pixels PX and is connected to a voltage supply unit CD.

Each pixel PX comprises a switching element SW, a pixel electrode PE, etc. The switching element SW is configured by a thin-film transistor (TFT), for example, and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The counter electrode CE is provided in common with a plurality of pixel electrodes PE. A liquid crystal layer LC is driven by an electric field generated between the pixel electrodes PE and the counter electrode CE. A capacitance CS is formed, for example, between an electrode having the same potential as the counter electrode CE and an electrode having the same potential as the pixel electrode PE.

Figure 15:
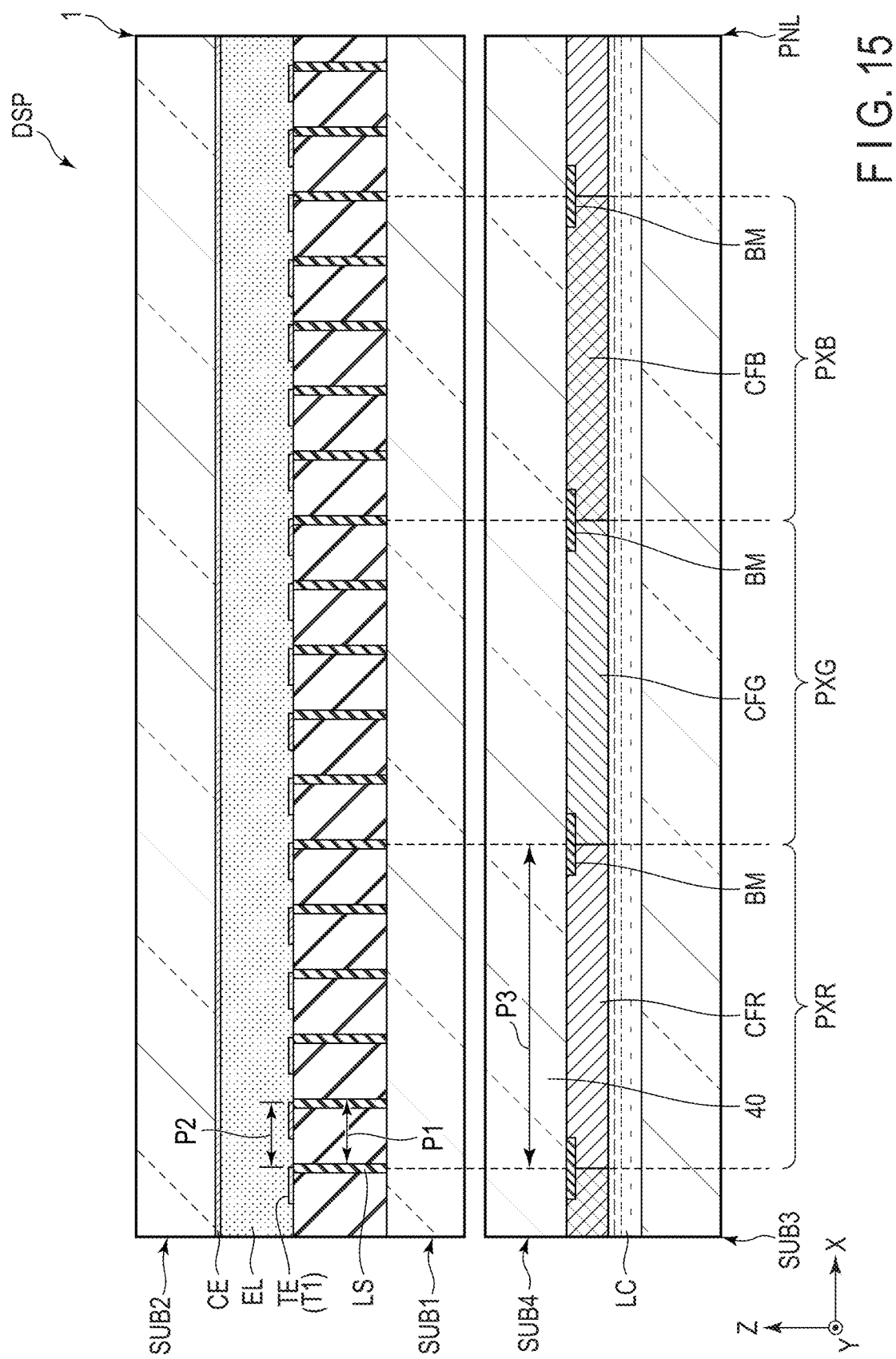
FIG. 15 is a cross-sectional view showing a configuration example of the display device DSP shown in FIG. 12.

FIG. 15 is a cross-sectional view showing a configuration example of the display device DSP shown in FIG. 12. Only the major parts necessary for explanation are shown here.

The third substrate SUB3 comprises the scanning line G, the signal line S, the switching element SW, the pixel electrode PE, etc. shown in FIG. 14.

The fourth substrate SUB4 comprises an insulating substrate 40, a light-shielding layer BM, a color filter layer CF, etc. The color filter layer CF includes a red color filter CFR disposed in a red pixel PXR, a green color filter CFG disposed in a green pixel PXG, and a blue color filter CFB disposed in a blue pixel PXB.

The red pixel PXR, the green pixel PXG, and the blue pixel PXB are arranged in the first direction X. A pixel pitch P3 along the first direction X is an integer multiple of one or more of a pitch P1 of a light-shielding portion LS or a pitch P2 of an electrode portion TE. In other words, in the example shown in FIG. 15, a plurality of light-shielding portions LS or a plurality of electrode portions TE overlap per pixel; however, at least one light-shielding portion LS or at least one electrode portion TE needs to overlap.

FIG. 16 is a plan view showing a configuration example of a pixel layout in a display panel PNL. In the configuration example shown in FIG. 16, a main pixel MP is configured by a red pixel PXR, a green pixel PXG, and a blue pixel PXB. Each of the red pixel PXR, the green pixel PXG, and the blue pixel PXB is partitioned by a light-shielding layer BM. Note that, in FIG. 16, the red pixel PXR, the green pixel PXG, and the blue pixel PXB are distinguished by different hatching, and the illustration of the color filter is omitted.

Here, the first direction X is a direction along a side SX1 of the display panel PNL, and the second direction Y is a direction along a side SY1 of the display panel PNL. The first direction X and the second direction Y are assumed to be orthogonal to each other. The red pixel PXR, the green pixel PXG, and the blue pixel PXB are arranged in the first direction X and extend along the second direction Y, respectively. Each pixel is formed in a substantially rectangular shape with a long side along the second direction Y. Of the light-shielding layer BM, a portion BMY between adjacent pixels in the first direction X is linearly extended along the second direction Y.

Figure 17:
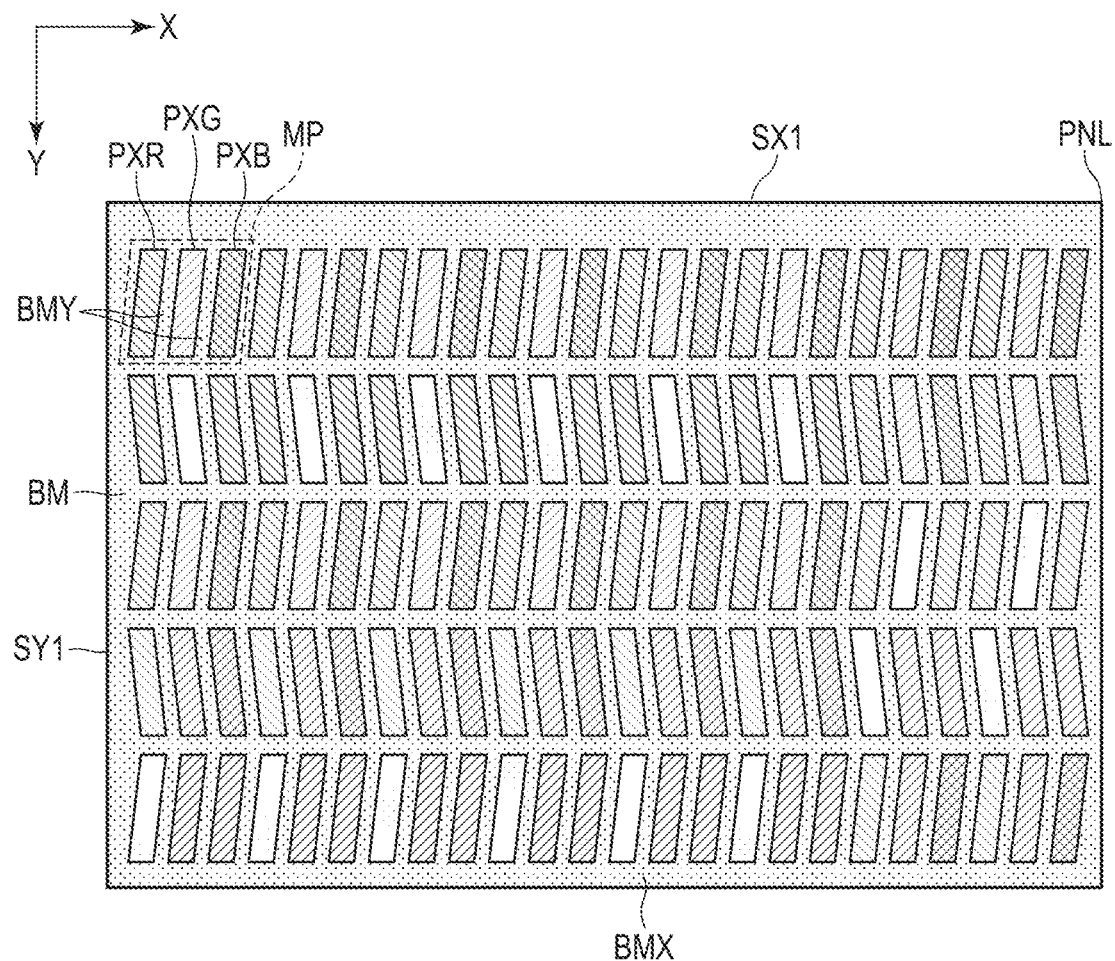
FIG. 17 is a plan view showing another configuration example of the pixel layout in the display panel PNL.

FIG. 17 is a plan view showing another configuration example of the pixel layout in the display panel PNL. The configuration example shown in FIG. 17 is different from the configuration example shown in FIG. 16 in that the red pixels PXR, the green pixels PXG, and the blue pixels PXB extend along a direction different from both the first direction X and the second direction Y, respectively. Each pixel is formed in a substantially parallel quadrilateral shape. Of the light-shielding layer BM, a portion BMY between adjacent pixels in the first direction X extends along a direction that is different from both the first direction X and the second direction Y.

Figure 18:
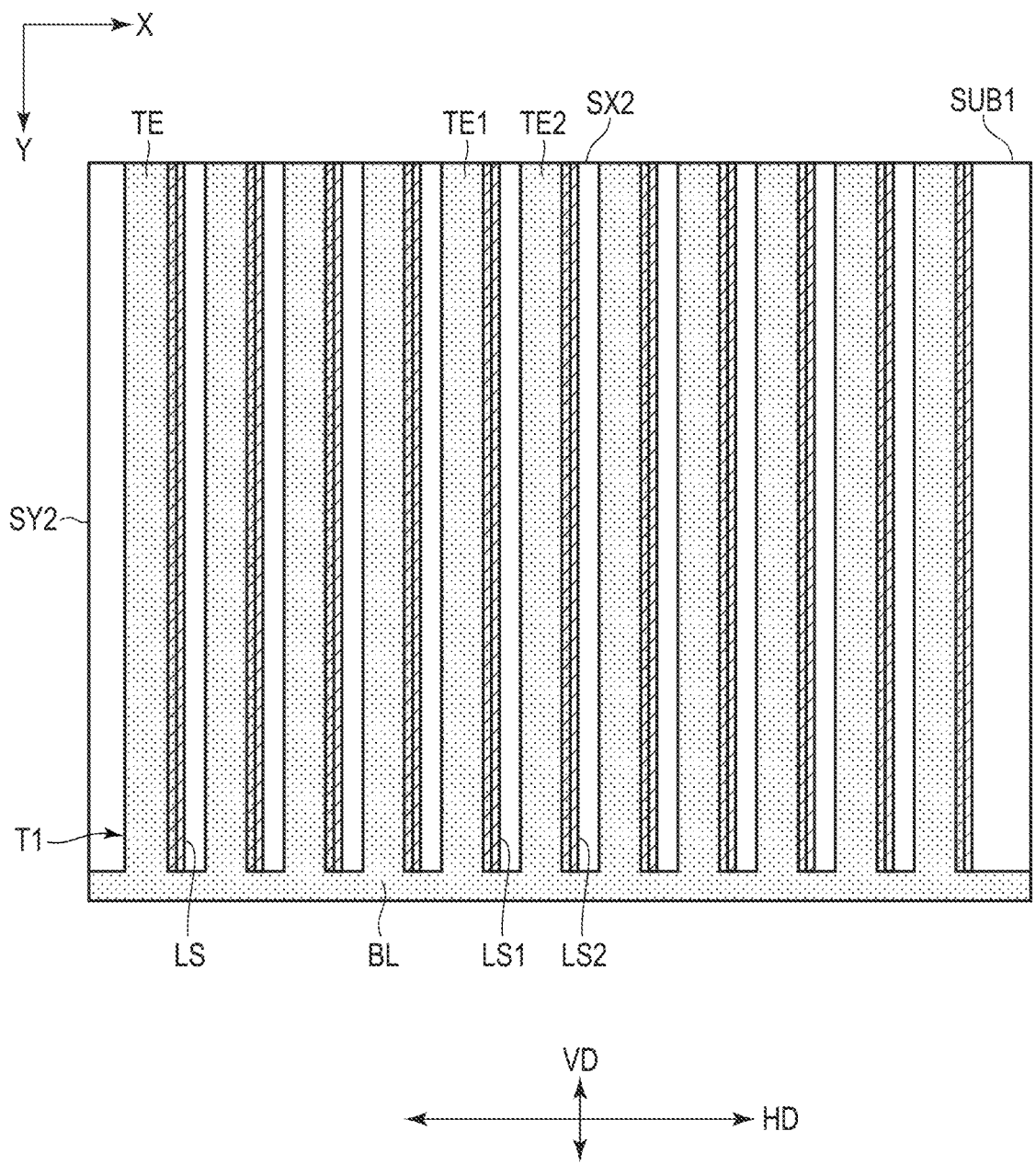
FIG. 18 is a plan view showing a configuration example of a first substrate SUB1 that configures a viewing angle control element.

FIG. 18 is a plan view of a configuration example of a first substrate SUB1 that configures a viewing angle control element. Here, the first direction X is a direction along a side SX2 of the first substrate SUB1, the second direction Y is a direction along a side SY2 of the first substrate SUB1, and the first direction X and the second direction Y are orthogonal to each other.

A light-shielding portion LS including a first light-shielding portion LS1 and a second light-shielding portion LS2 is arranged in the first direction X and extends linearly along the second direction Y, respectively, as shown by the shaded hatching. In addition to a plurality of electrode portions TE, a first transparent electrode T1 has a bus line BL extended along the first direction X. Each of the electrode portions TE arranged at intervals along the first direction X is connected to the bus line BL. The bus line BL overlaps the display panel PNL outside the display area DA shown in FIG. 12, and overlaps a portion BMX extending along the first direction X among the light-shielding layers BM shown in FIG. 16 or FIG. 17.

The electrode portions TE including a first electrode portion TE1 and a second electrode portion TE2 are arranged in the first direction X and extend linearly along the second direction Y, respectively. In other words, each of the electrode portions TE extends substantially parallel to the light-shielding portion LS in planar view. From another viewpoint, the electrode portion TE and the light-shielding portion LS extend substantially parallel to the side SY2.

The viewing angle control element 1 with such a first substrate SUB1 can be combined with the display panel PNL shown in FIG. 16 and FIG. 17, respectively. At this time, the viewing angle control element 1 is disposed so that the side SX1 of the display panel PNL and the side SX2 of the first substrate SUB1 become parallel or superposed. From the viewpoint of suppressing moire when the display panel PNL and the viewing angle control element 1 overlap, it is desirable to combine the first substrate SUB1 shown in FIG. 18 with the display panel PNL shown in FIG. 17. In other words, it is desirable that the extending direction of the first electrode portion TE1 and the second electrode portion TE2 is different from the extending direction of each pixel.

Figure 19:
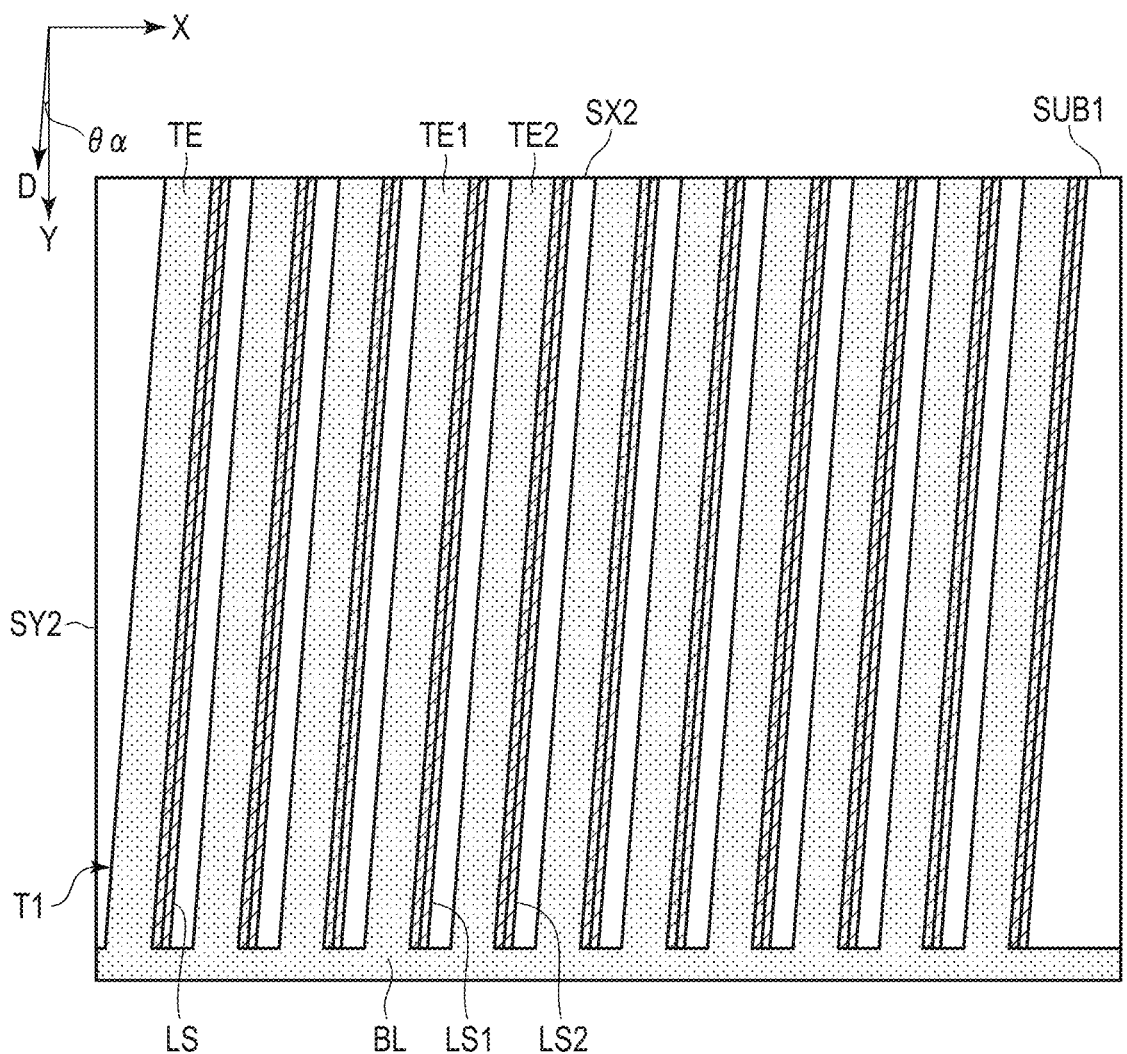
FIG. 19 is a plan view showing another configuration example of the first substrate SUB1 that configures the viewing angle control element.

FIG. 19 is a plan view showing another configuration example of the first substrate SUB1 that configures the viewing angle control element. The configuration example shown in FIG. 19 is different from the configuration example shown in FIG. 18 in that an electrode portion TE and a light-shielding portion LS extend linearly along a direction D that is different from both the first direction X and the second direction Y, respectively. Each of the electrode portions TE extends substantially parallel to the light-shielding portion LS in planar view. From another viewpoint, the electrode portion TE and the light-shielding portion LS extend in an oblique direction with respect to a side SY2. An angle θα between the second direction Y and the direction D is an acute angle of less than 45°; for example, greater than 0° and less than 20°.

The viewing angle control element 1 comprising such a first substrate SUB1 can be combined with the display panel PNL shown in FIG. 16 and FIG. 17, respectively. At this time, the viewing angle control element 1 is disposed so that the side SX1 of the display panel PNL and a side SX2 of the first substrate SUB1 become parallel or superposed. From the viewpoint of suppressing moire when the display panel PNL and the viewing angle control element 1 overlap, it is desirable to combine the first substrate SUB1 shown in FIG. 19 with the display panel PNL shown in FIG. 16.

Figure 20:
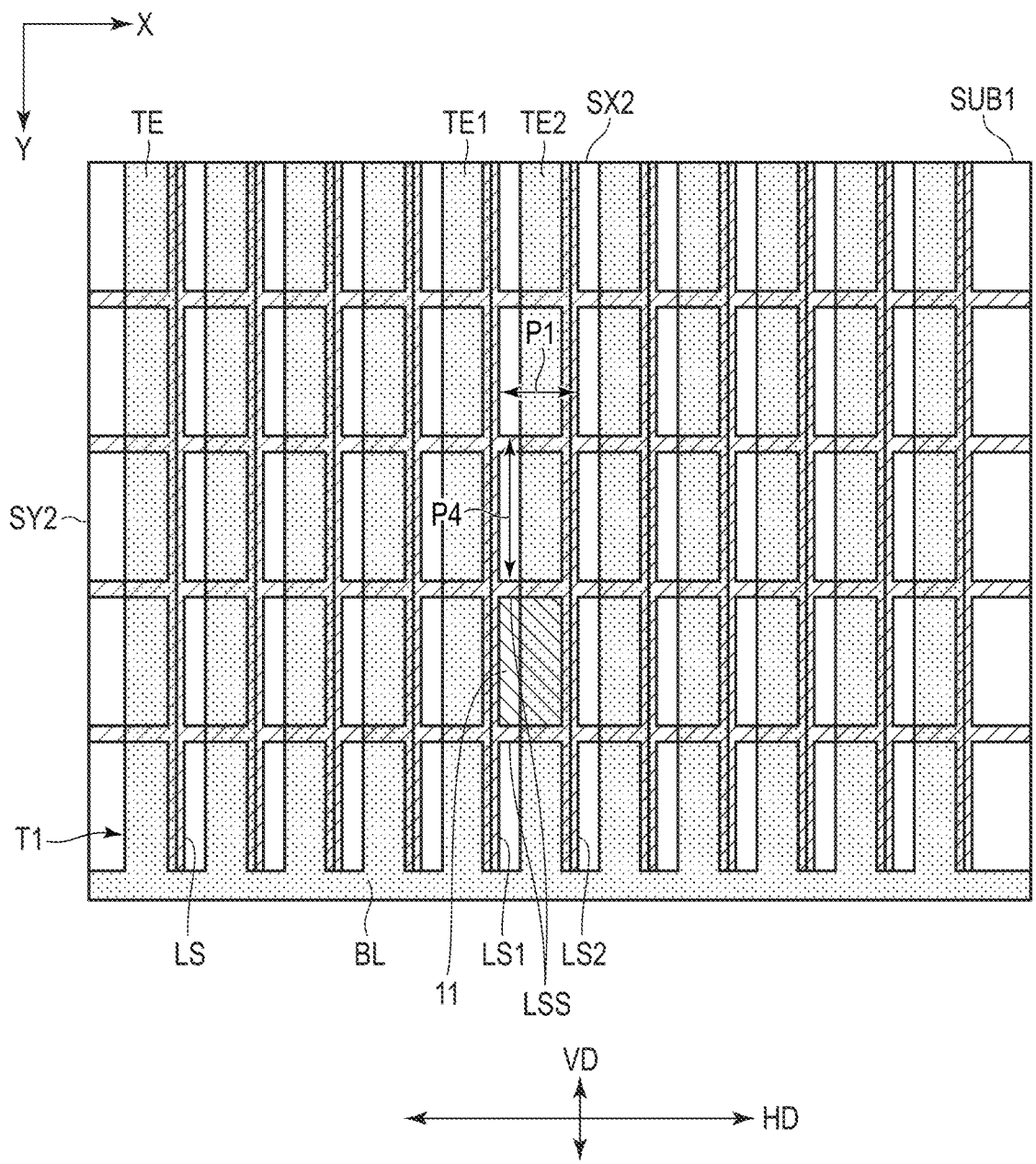
FIG. 20 is a plan view showing another configuration example of the first substrate SUB1 that configures the viewing angle control element.

FIG. 20 is a plan view of another configuration example of the first substrate SUB1 that configures the viewing angle control element. The configuration example shown in FIG. 20 differs from the configuration example shown in FIG. 18 in that a sub-light-shielding portion LSS is provided between a first light-shielding portion LS1 and a second light-shielding portion LS2. The sub-light-shielding portion LSS is also provided between other adjacent light-shielding portions LS, respectively. A first transparent insulating layer 11, shown in FIG. 20 with shaded hatching, is surrounded by the first light-shielding portion LS1, the second light-shielding portion LS2, and two adjacent sub-light-shielding portions LSS. A pitch P4 of the adjacent sub-light-shielding portions LSS in the second direction Y is larger than a pitch P1 of the adjacent light-shielding portions LS in the first direction X.

The viewing angle control element 1 comprising such a first substrate SUB1 can be combined with the display panel PNL shown in FIG. 16 and FIG. 17, respectively. Since, the sub-light-shielding portions LSS arranged in the second direction Y are provided in addition to the light-shielding portions LS arranged in the first direction X, in addition to the viewing angle control in a screen horizontal direction HD along the first direction X, the viewing angle in a screen vertical direction VD along the second direction Y can also be controlled.

As described above, the present embodiment can provide a viewing angle control element and a display device capable of controlling the viewing angle.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A viewing angle control element comprising a first substrate, a second substrate, and an electrolyte layer provided between the first substrate and the second substrate and including an electrochromic material, wherein
the first substrate comprises:
a first transparent substrate;
a first light-shielding portion and a second light-shielding portion provided between the first transparent substrate and the electrolyte layer;
a first transparent insulating layer provided between the first light-shielding portion and the second light-shielding portion; and
a first transparent electrode in contact with the electrolyte layer, wherein
the first transparent electrode includes a first electrode portion overlapping the first light-shielding portion, a second electrode portion overlapping the second light-shielding portion, and an opening portion overlapping the first transparent insulating layer,
the first transparent insulating layer protrudes toward the second substrate, and includes a top part, a first slope between the top part and the first light-shielding portion, and a second slope between the top part and the second light-shielding portion, and
the second electrode portion is provided on the second slope.

2. The viewing angle control element of claim 1, wherein
the second electrode portion overlaps the first transparent insulating layer, and
the opening portion is proximate to the first light-shielding portion between the first-light shielding portion and the second light shielding portion.

3. The viewing angle control element of claim 1, wherein
each of the first electrode portion and the second electrode portion overlaps the first transparent insulating layer, and
the opening portion is positioned substantially in a center between the first light-shielding portion and the second light-shielding potion.

4. The viewing angle control element of claim 1, wherein
the second substrate comprises:
a second transparent substrate;
a third light-shielding portion and a fourth light-shielding portion provided between the second transparent substrate and the electrolyte layer;
a second transparent insulating layer provided between the third light-shielding portion and the fourth light-shielding portion; and
a second transparent electrode in contact with the electrolyte layer, wherein
the third light-shielding portion is positioned directly above the first light-shielding portion,
the fourth light-shielding portion is positioned directly above the second light-shielding portion, and the second transparent electrode includes a third electrode portion overlapping the third light-shielding portion, a fourth electrode portion overlapping the fourth light-shielding portion, and an opening portion overlapping the second transparent insulating layer.

5. The viewing angle control element of claim 4, wherein
the second substrate further comprises a second counter electrode being transparent and in contact with the electrolyte layer, and
the second counter electrode is disposed between the third electrode portion and the fourth electrode portion.

6. The viewing angle control element of claim 1, wherein
the first transparent insulating layer is interposed between the first light-shielding portion and the first electrode portion, and between the second light-shielding portion and the second electrode portion.

7. The viewing angle control element of claim 1, wherein
the first transparent insulating layer includes a first insulating layer between the first transparent substrate and the electrolyte layer, and a second insulating layer between the first insulating layer and the electrolyte layer,
the first light-shielding portion includes a first portion between the first transparent substrate and the first insulating layer, and a second portion between the first insulating layer and the second insulating layer, and
the second portion is positioned directly above the first portion.

8. The viewing angle control element of claim 1, wherein
a pitch between the first light shielding portion and the second light shielding portion is equal to or greater than a thickness of the first transparent insulating layer.

9. The viewing angle control element of claim 1, wherein
a thickness of the first transparent insulating layer is equal to or greater than a thickness of the first light-shielding portion and the second light-shielding portion.

10. The viewing angle control element of claim 1, wherein
the first transparent insulating layer, the first light-shielding portion, and the second light-shielding portion are formed of an organic material.

11. The viewing angle control element of claim 1, wherein
the second substrate comprises:
a second transparent substrate; and
a counter electrode being transparent and in contact with the electrolyte layer, wherein
the counter electrode faces the first transparent electrode via the electrolyte layer.

12. The viewing angle control element of claim 1, wherein
the first substrate further comprises a first counter electrode being transparent and in contact with the electrolyte layer, and
the first counter electrode is disposed between the first electrode portion and the second electrode portion.

13. A viewing angle control element comprising a first substrate, a second substrate, and an electrolyte layer provided between the first substrate and the second substrate and including an electrochromic material, wherein
the first substrate comprises:
a first transparent substrate;
a first light-shielding portion and a second light-shielding portion provided between the first transparent substrate and the electrolyte layer;
a first transparent insulating layer provided between the first light-shielding portion and the second light-shielding portion; and
a first transparent electrode in contact with the electrolyte layer, wherein the first transparent electrode includes a first electrode portion overlapping the first light-shielding portion, a second electrode portion overlapping the second light-shielding portion, and an opening portion overlapping the first transparent insulating layer, and each of the first light-shielding portion and the second light-shielding portion has a thickness of at least 1.5 times a maximum width thereof.

14. A display device comprising:

a display panel comprising a plurality of pixels; and a viewing angle control element overlapping the display panel, wherein the viewing angle control element comprises a first substrate, a second substrate, and an electrolyte layer provided between the first substrate and the second substrate and including an electrochromic material, the first substrate comprises:

a first transparent substrate;

a first light-shielding portion and a second light-shielding portion provided between the first transparent substrate and the electrolyte layer;

a first transparent insulating layer provided between the first light-shielding portion and the second light-shielding portion; and a first transparent electrode in contact with the electrolyte layer, wherein the first transparent electrode includes a first electrode portion overlapping the first light-shielding portion, a second electrode portion overlapping the second light-shielding portion, and an opening portion overlapping the first transparent insulating layer, in planar view, the first electrode portion and the second electrode portion extend substantially parallel to the first light-shielding portion and the second light-shielding portion, respectively, and an extending direction of the first electrode portion and the second electrode portion is different from an extending direction of each of the pixels.

15. The display device of claim 14, wherein the first substrate further comprises a sub-light-shielding portion provided between the first light-shielding portion and the second light-shielding portion, and the first transparent insulating layer is surrounded by the first light-shielding portion, the second light-shielding portion, and the sub-light-shielding portion.

16. The display device of claim 14, wherein a pitch between pixels is an integral multiple of a pitch between the first light-shielding portion and the second light-shielding portion.

17. The display device of claim 14, wherein the display panel comprises a light-shielding layer that partitions each of the pixels, the first transparent electrode further includes a bus line connected to the first electrode portion and the second electrode portion, and the bus line overlaps the light-shielding layer.

* * * * *